US010507439B2

(12) United States Patent
Roy

(10) Patent No.: US 10,507,439 B2
(45) Date of Patent: Dec. 17, 2019

(54) PLASMA INDUCED FLUID MIXING

(75) Inventor: Subrata Roy, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 553 days.

(21) Appl. No.: 13/702,286

(22) PCT Filed: Jun. 7, 2011

(86) PCT No.: PCT/US2011/039495
§ 371 (c)(1),
(2), (4) Date: Dec. 5, 2012

(87) PCT Pub. No.: WO2011/156408
PCT Pub. Date: Dec. 15, 2011

(65) Prior Publication Data
US 2013/0077434 A1 Mar. 28, 2013

Related U.S. Application Data

(60) Provisional application No. 61/352,173, filed on Jun. 7, 2010.

(51) Int. Cl.
*B01F 3/02* (2006.01)
*B01F 13/00* (2006.01)
(Continued)

(52) U.S. Cl.
CPC ............ *B01F 3/02* (2013.01); *B01F 13/0003* (2013.01); *B01J 19/088* (2013.01); *F23D 11/40* (2013.01);
(Continued)

(58) Field of Classification Search
CPC ....... B01F 13/0003; B01F 3/02; B01J 19/088; B01J 2219/0809; B01J 2219/0875;
(Continued)

(56) References Cited

U.S. PATENT DOCUMENTS 4,161,439 A 7/1979 Warren et al.
4,735,633 A * 4/1988 Chiu ...................... B01D 53/00
118/723 E (Continued)

FOREIGN PATENT DOCUMENTS

JP 2008-062190 3/2008
WO WO-1998-007546 2/1998

OTHER PUBLICATIONS

Roy, S., et al., "Bulk Flow Modification with Horseshoe and Serpentine Plasma Actuators," *Journal of Physics D: Applied Physics*, 2009, vol. 42, Doc. No. 032004.

(Continued)

*Primary Examiner* — Tony G Soohoo
(74) *Attorney, Agent, or Firm* — Thomas | Horstemeyer, LLP

(57) ABSTRACT

Embodiments of the subject invention are directed to methods and apparatus for inducing mixing in a fluid using one or more plasma actuators. In an embodiment, a pair of electrodes is positioned near a fluid and a voltage potential is applied across the pair of electrodes such that a plasma discharge is produced in the fluid. In an embodiment, the plasma discharge creates turbulence in the fluid thereby mixing the fluid. In an embodiment, flow structures, such as vortices are generated in the fluid. In an embodiment, the fluid is mixed in three dimensions. In an embodiment, a plurality of fluids are mixed. In an embodiment, solids are dispersed in at least one fluid. In an embodiment, heat or other properties are dispersed within at least one fluid. In an embodiment, at least one of the pair of electrodes has a serpentine shape.

16 Claims, 33 Drawing Sheets

(51) Int. Cl.
  *B01J 19/08* (2006.01)
  *F23D 11/40* (2006.01)
  *F23D 14/62* (2006.01)
  *F23D 14/68* (2006.01)

(52) U.S. Cl.
  CPC ............ *F23D 14/62* (2013.01); *F23D 14/68* (2013.01); *B01J 2219/0809* (2013.01); *B01J 2219/0875* (2013.01); *B01J 2219/0877* (2013.01); *B01J 2219/0894* (2013.01)

(58) Field of Classification Search
  CPC ....... B01J 2219/0877; B01J 2219/0894; F23D 11/40; F23D 14/62; F23D 14/68
  USPC ...................................................... 366/152.4
  See application file for complete search history.

(56) References Cited

U.S. PATENT DOCUMENTS

| | | | | |
|---|---|---|---|---|
| 6,245,299 | B1* | 6/2001 | Shiloh | B01D 53/326 422/121 |
| 7,452,513 | B2 | 11/2008 | Matveev | |
| 2008/0260578 | A1* | 10/2008 | Engennann | A23L 3/28 422/400 |
| 2010/0127624 | A1* | 5/2010 | Roy | B64C 23/005 315/111.21 |
| 2011/0116967 | A1* | 5/2011 | Roy | A61L 2/14 422/22 |

OTHER PUBLICATIONS

Wang, C.C., et al., "Three-Dimensional Effects of Curved Plasma Actuators in Quiescent Air," *Journal of Applied Physics*, Apr. 15, 2011, vol. 109, No. 8, Doc. No. 083305.

Wang, C.C., et al., "Three-Dimensional Simulation of a Microplasma Pump," *Journal of Physics D: Applied Physics*, Sep. 21, 2009, vol. 42, No. 18, Doc. No. 185206.

Das Gupta, Arnob and Subrata Roy, Effect of plasma actuator control parameters on a transitional flow, Journal of Physics D: Applied Physics, 2017, p. 1-13, vol. 51, IOP Publishing, printed in the United Kingdom.

Das Gupta, Arnob and Subrata Roy, Three-dimensional plasma actuation for faster transition to turbulence, Journal of Physics D: Applied Physics, 2018, p. 1-15, vol. 50, IOP Publishing, printed in the United Kingdom.

Durscher, R J and S Roy, Three-dimensional flow measurements induced from serpentine plasma actuators in quiescent air, Journal of Physics D: Applied Physics, 2012, p. 1-9, vol. 45, IOP Publishing, printed in the United Kingdom and the United States.

Riherd, Mark and Subrata Roy, Serpentine geometry plasma actuators for flow control, Journal of Applied Physics, 2013, p. 1-13, vol. 114, AIP Publishing LLC.

* cited by examiner

Square

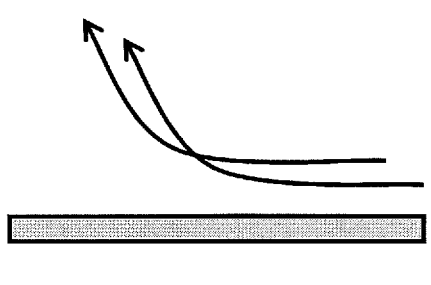
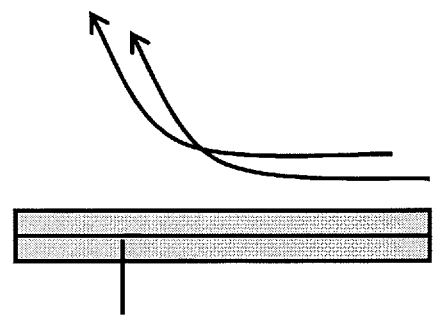
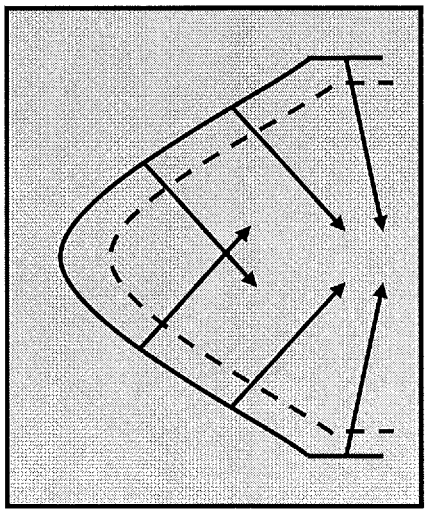
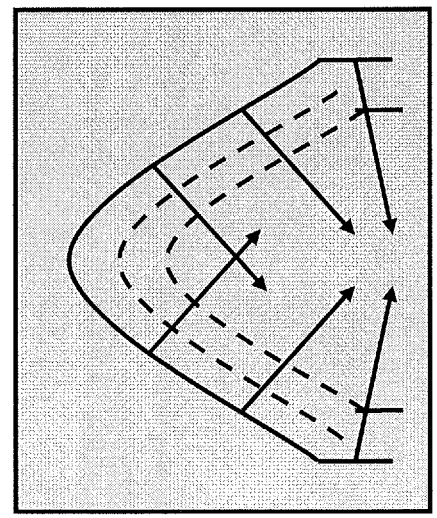
FIG. 7A
FIG. 7B

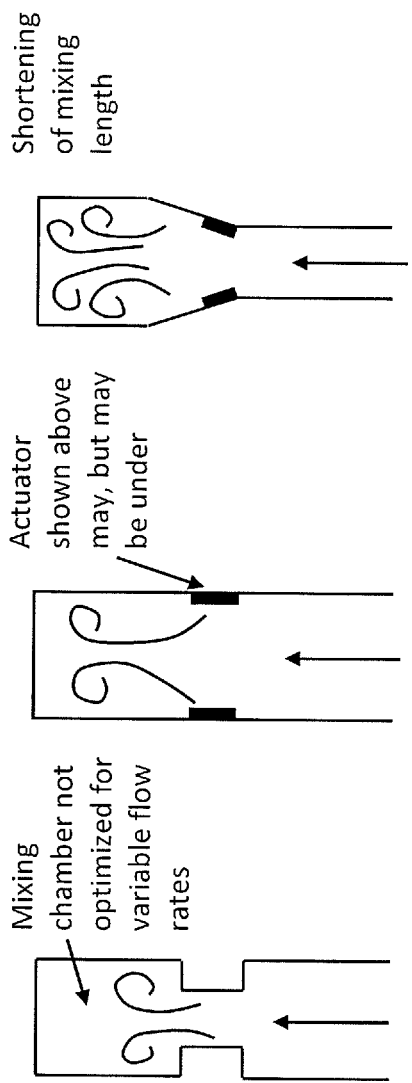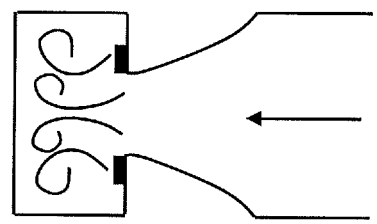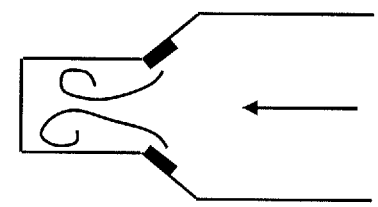
FIG. 15A  FIG. 15B  FIG. 15C
FIG. 15D  FIG. 15E  FIG. 15F Triangular B. Triangular
Time = 0.0160 sec A. Linear
Time = 0.0160 sec

PLASMA INDUCED FLUID MIXING

CROSS-REFERENCE TO RELATED APPLICATIONS

The present application is the U.S. National Stage Application of International Patent Application No. PCT/US2011/039495, filed on Jun. 7, 2011, which claims the benefit of U.S. Provisional patent application no. 61/352,173, filed Jun. 7, 2010, both of which are hereby incorporated by reference herein in their entirety, including any figures, tables, or drawings.

The subject invention was made with government support under Air Force Office of Scientific Research, Contract No. FA9550-09-1-0372. The government has certain rights to this invention.

BACKGROUND OF INVENTION

Mixing fluids is a problem in various fields, for example reducing drag over a surface, convective heat transfer, noise control, and air-fuel mixing before combustion, among other fields. In various applications, mixing fluids efficiently can lead to higher performance, decreased by-products (pollution), among other benefits.

BRIEF SUMMARY

Embodiments of the subject invention are directed to a method and apparatus for inducing mixing in a fluid using one or more plasma actuators. In an embodiment, a pair of electrodes is positioned near a fluid and a voltage potential is applied across the pair of electrodes such that a plasma discharge is produced in the fluid. The plasma discharge can create turbulence in the fluid, so as to, for example, mix the fluid. In an embodiment, the fluid is mixed in three dimensions. Flow structures, such as eddies, can be generated in the fluid. In a specific embodiment, a vortex is generated in the fluid. In an embodiment, a complex three-dimensional vortical flow structure is generated. In another embodiment, one or more counter-rotating vortex pairs are generated. Other two- and three-dimensional flow structures are known in the art and can be generated in accordance with embodiments of the subject invention.

In an embodiment, the pair of electrodes is positioned such that when the plasma discharge is produced an electrohydrodynamic (EHD) body force is generated that induces mixing in the fluid. In an embodiment, a plurality of fluids are mixed. Particulates, ions, or other solids can be dispersed in at least one fluid to be mixed. In an embodiment, moisture, heat, pressure, pH, thermodynamic, chemical, or other properties vary within at least one fluid to be mixed. In an embodiment, such solids and/or properties are rapidly mixed and/or made uniform, respectively, in the fluid.

In an embodiment, a serpentine plasma actuator is used to produce at least one plasma discharge in a fluid. The serpentine plasma actuator can incorporate a pair of electrodes, where at least one of the pair of electrodes has a serpentine shape. The at least one serpentine electrode can have one or more of turns. In an embodiment, when the serpentine plasma actuator is powered at least one plasma discharge is produced in the fluid. In an embodiment, each at least one plasma discharge induces at least one force in the fluid. In an embodiment, each of the at least one force is an EHD body force. The at least one force can create turbulence in the fluid. In an embodiment, the at least one force generates one or more flow structures in the fluid. In a particular embodiment, one or more counter-rotating vortex pairs are generated in the fluid.

As further discussed below, the subject invention can be used for various applications, such as mixing reagents, air and fuel, or other ingredients; facilitating convective heat transfer; reducing drag over a surface; noise control; among other applications. Embodiments of the subject invention are not limited to those applications explicitly discussed herein.

BRIEF DESCRIPTION OF DRAWINGS

FIGS. 7A-7B depict the use of a particular electrode shape for a plasma actuator in accordance with an embodiment of the subject invention.

FIGS. 15A-15F show modifications to a standard air-fuel mixing chamber in accordance with embodiments of the subject invention.

DETAILED DISCLOSURE

Figure 2:
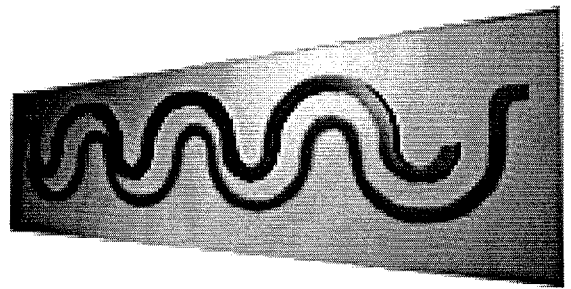
FIG. 2 shows a pair of electrodes in a serpentine plasma actuator in accordance with an embodiment of the subject invention.

Embodiments of the subject invention are directed to a method and apparatus for inducing mixing in a fluid using one or more plasma actuators. In an embodiment, a pair of electrodes is positioned near a fluid (or the fluid is positioned near the pair of electrodes) and a voltage potential is applied across the pair of electrodes such that a plasma discharge is produced in the fluid. In an embodiment, the plasma discharge creates turbulence in the fluid, so as to, for example, mix the fluid. In an embodiment, the fluid is mixed in three dimensions. In an embodiment, flow structures, such as eddies, are generated in the fluid. In an embodiment, a vortex is generated in the fluid. A complex three-dimensional vortical flow structure can be generated. In an embodiment, at least one counter-rotating vortex pair (CVP) is generated. Other two- and three-dimensional flow structures are known in the art and can be generated in accordance with embodiments of the subject invention.

In an embodiment, the pair of electrodes is positioned such that when the plasma discharge is produced an electrohydrodynamic (EHD) body force is generated that induces mixing in the fluid. In an embodiment, a plurality of fluids are mixed. Particulates, ions, or other solids can be dispersed in at least one fluid to be mixed. In an embodiment, moisture, heat, pressure, pH, thermodynamic, chemical, or other properties vary within at least one fluid to be mixed. Such solids and/or properties can be rapidly mixed and/or made more uniform, respectively, in the fluid.

Various configurations of electrodes can be used with the subject invention. In an embodiment, the fluid is positioned or passes between the pair of electrodes. In another embodiment, the fluid is positioned or passes over the pair of electrodes. One or both of the pair of electrodes can be exposed to the fluid. In a particular embodiment, a first electrode of the pair of electrodes is separated from a second electrode of the pair of electrodes by an insulating material. In an embodiment, the first electrode is exposed to the fluid. In an embodiment, the second electrode is separated from the fluid by the insulating material.

In an embodiment, each electrode of the pair of electrodes is positioned on or proximate at least one surface positioned near the fluid. In an embodiment, the at least one surface forms a wall or other structure and the fluid is positioned in contact with the structure. The at least one surface can form a chamber or flow region and the fluid can be positioned inside the chamber or flow region. In an embodiment, the pair of electrodes is positioned on or proximate one of the at least one surface. The surface can incorporate an insulating material. In an embodiment, an exposed electrode of the pair of electrodes is exposed to the fluid and an embedded electrode of the pair of electrodes is separated from the exposed electrode by the insulating material such that when the pair of electrodes is powered a surface plasma discharge is produced. In an embodiment, the pair of electrodes is positioned across at least a portion of the chamber or flow region such that when the pair of electrodes is powered a volumetric plasma discharge is produced.

Figure 3:
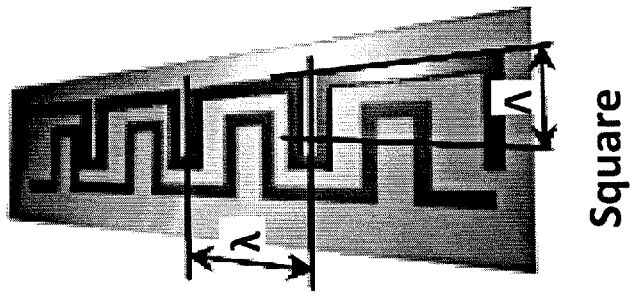
FIG. 3 shows a pair of electrodes in a square serpentine plasma actuator in accordance with an embodiment of the subject invention.

In an embodiment, at least one electrode of the pair of electrodes has a serpentine shape to provide a serpentine plasma actuator. The at least one serpentine electrode can be formed with one or more of turns. The electrodes of the pair of electrodes can be located such that a constant distance is maintained between the two electrodes. In an embodiment, the at least one serpentine electrode is formed with a plurality of turns. In an embodiment, the turns include hard angles as shown in FIG. 3. In an embodiment, the turns include softer curves as shown in FIG. 2. In other embodiments, the turns can include hard angles, softer curves, and/or other types of turns. In an embodiment, the turns are confined to two dimensions such that the serpentine electrode can be contained within a plane. In another embodiment, the turns encompass three dimensions. In an embodiment, each of the pair of electrodes is formed with one or more turns. In an embodiment, each of the pair of electrodes is formed with a plurality of turns. In an embodiment, at least a portion of each of the pair of electrodes has the same pattern of turns, such that for each turn in a portion of a first electrode of the pair there is a corresponding turn in a corresponding portion of a second electrode of the pair. In an embodiment, the corresponding turns are in the same order on each of the electrodes. In an embodiment, each of the turns on one electrode of the pair are spaced approximately the same distance apart from each other as the corresponding turns on the other electrode of the pair. In an embodiment, the electrodes are positioned parallel to each other in the same plane. In an embodiment, the turns of the electrodes are in phase such that each of the corresponding turns is made in the same direction, as shown in FIGS. 2 and 3. In another embodiment, the turns are out of phase with each other. In an embodiment, each of the corresponding turns is made in an opposite direction. In a further embodiment, the turns are formed in three dimensions. In an embodiment, the electrodes are spatially aligned such that the corresponding turns are proximate to each other. In an embodiment, when the serpentine plasma actuator is powered at least one plasma discharge is produced in the fluid. In an embodiment, each at least one plasma discharge induces at least one force in the fluid. In an embodiment, each of the at least one force is an EHD body force. In an embodiment, the at least one force creates turbulence in the fluid. In an embodiment, the at least one force generates one or more flow structures in the fluid as discussed above. In a particular embodiment, one or more CVPs are generated in the fluid.

In an embodiment, additional pairs of electrodes are positioned near the fluid and powered to produce additional plasma discharges as discussed above. In an embodiment, a voltage potential is applied to each pair of electrodes in timed phases. In an embodiment, three or more electrodes are positioned near the fluid and powered in phased pairs. In an embodiment, a multi-layer arrangement of electrodes is used in which electrodes are arranged in a plurality of layers, each layer of electrodes separated by an insulating material. In an embodiment, several layers of a dielectric substrate are formed, each layer enveloping at least one electrode.

In an embodiment, at least one power source is provided for powering the electrodes. In an embodiment, the pair of electrodes includes a grounded electrode and a powered electrode, which is powered to achieve the voltage potential. In an embodiment, both electrodes of the pair are powered at different voltages to achieve the voltage potential. In various embodiments, alternating current (AC) and/or direct current (DC) power sources can be used. In an embodiment, electrodes pairs on the same surface or layer are maintained at a potential bias using steady, pulsed direct, or alternating current. In an embodiment, electrode pairs are separated by an insulating material where one electrode of the pair is powered with dc or ac operating at a radio frequency (RF) with respect to the other. In an embodiment, a powered electrode of the pair is powered at RF voltages, while a grounded electrode of the pair is grounded. In another arrangement, both electrodes are powered with signals separated by a beat frequency.

In an embodiment of the subject invention, at least one pair of electrodes is powered to produce at least one plasma discharge in a fluid. Each powered pair of electrodes can be referred to as a plasma actuator. In an embodiment, a plasma actuator can incorporate at least three electrodes. In an embodiment, the electrodes or powered in phased pairs. In an embodiment, a multi-layer arrangement of electrodes is used. Various other plasma actuator configurations are possible. Illustrative examples of such configurations are provided throughout the application. In an embodiment, one or more of the at least one plasma discharge is a localized electrical discharge. In an embodiment, each at least on plasma discharge generates at least one force in the fluid. In an embodiment, each of the at least one force is an EHD body force.

In an embodiment, the fluid flows over a surface such that a boundary layer is created in the flow proximate to the surface. In an embodiment, a plasma actuator is positioned on or near the surface and the at least one plasma discharge improves mixing of the fluid inside the boundary layer. In an embodiment, the at least one plasma discharge improves mixing of the fluid outside the boundary layer. In an embodiment, the at least one plasma discharge increases the height of the boundary layer, increasing turbulence in the fluid further from the surface. In an embodiment, the at least one plasma discharge generates turbulence that reduces drag over the surface.

In an embodiment, one or more plasma actuators as described herein are used to mix air, fuel, and/or other fluids. In an embodiment, one or more plasma actuators as described herein are used to mix solids into one or more fluids. One or more plasma actuators can be used to homogenize properties of a fluid. For example, in an embodiment, the one or more plasma actuators are used to disperse heat throughout the fluid. The use of such plasma actuators results in a more uniform mixture of the fluid. In an embodiment, the use of such plasma actuators results in a more rapid mixing of the fluid. In an embodiment, the use of such plasma actuators results in a certain uniformity of the fluid being reached in less time. In an embodiment, the use of such plasma actuators results in a certain stoichiometric ratio of the fluid being reached in less time. In an embodiment, such plasma actuators are used to mix air and fuel before combustion. In an embodiment, the use of such plasma actuators results in more efficient combustion of the mixture. In an embodiment, higher performance is gained from such combustion. In an embodiment, fewer by-products are produced by such combustion.

In an embodiment, one or more plasma actuators as described herein are used to combine fuel and air for combustion. In an embodiment, the air and fuel are combined in a mixing chamber. In an embodiment, at least one of the one or more plasma actuators is positioned on at least one surface of the mixing chamber. In an embodiment, a dimension of the mixing chamber can be reduced without loss of power because of increased mixing efficiency caused by the one or more plasma actuators. In an embodiment, the length of the mixing chamber is reduced. In embodiments, such improvements can be applied to energy, aerospace, and other applications.

In an embodiment, one or more plasma actuators are used for flow management of a fluid.

In an embodiment, one or more plasma actuators are used to control noise caused by the flowing of a fluid. In an embodiment, at least one plasma discharge produced by the one or more plasma actuators suppresses the formation of loud flow structures in the fluid, thereby reducing noise caused by the fluid's flow.

In an embodiment, one or more plasma actuators are used for convective heat transfer. In an embodiment, at least one plasma discharge produced by the one or more plasma actuators causes turbulence in the fluid that facilitates heat transfer within the fluid. In an embodiment, the at least one plasma discharge facilitates heat transfer from the surface to portions of the fluid. In an embodiment, the at least one plasma discharge increases the height of the boundary layer thereby facilitating heat transfer from portions of the fluid near the surface to portions of the fluid further from the surface. In an embodiment, the surface is an actively tuned surface. In an embodiment, the actively tuned surface generates a higher convective heat transfer coefficient for the fluid. In an embodiment, a maximum heat transfer coefficient is achieved where the at least plasma discharge generates a flow regime in the fluid that is at the end of transition and beginning of turbulent flow. In an embodiment, the fluid is a mixture of a plurality of fluids. The configurations discussed can also be used to disperse moisture, pressure, pH, or other properties within the fluid.

In an embodiment, one or more plasma actuators are used to promote three-dimensional mixing of one or more fluids, solids, or properties of fluids. In an embodiment, air or other fluids are mixed with fuel. In an embodiment, reagents to a chemical reaction are mixed. In an embodiment, other ingredients are mixed. In an embodiment, use of the at least one plasma discharge reduces the time or space needed for mixing the ingredients.

Figure 1:
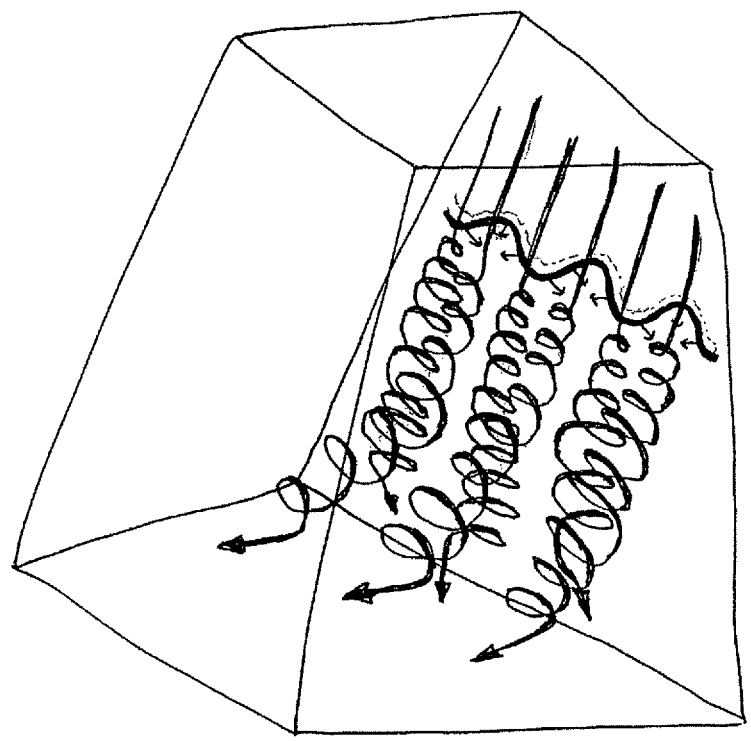
FIG. 1 is a schematic showing predicted flow structures generated by a serpentine plasma actuator in accordance with an embodiment of the subject invention.
Figure 1:
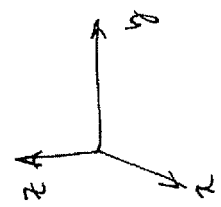

A hypothetical example of such mixing is shown in FIG. 1. In the embodiment shown, a fluid passes over a serpentine actuator in laminar flow. When the actuator is powered, at least one plasma discharge is produced in the flow. As shown, the at least one plasma discharge induces one or more forces on the flow, thereby generating turbulence. In an embodiment, the one or more forces are EHD body forces. In an embodiment, flow structures, such as eddies, are generated in the flow. In an embodiment, a vortex is generated in the flow. In an embodiment, the fluid is mixed in three dimensions. In the embodiment shown, counter-rotating vortex pairs are generated. As shown, the CVPs cause mixing of different portions of the fluid. In an embodiment, a plurality of fluids are mixed. In an embodiment, solids are mixed with at least one fluid.

Various types of actuators can be used to induce such mixing or transition to turbulence. FIGS. 2-12 show a few illustrative examples. Other structures can also be used with the subject invention.

FIG. 2 shows a serpentine plasma actuator in accordance with an embodiment of the subject invention. The embodiment shown includes a pair of electrodes, each having a corresponding plurality of curves to form a serpentine shape. In the embodiment shown, the corresponding curves of the electrodes are in the same order and in phase with each other. In the embodiment show, the corresponding curves are also spaced the same distance apart on each electrode, and each corresponding curve is in the same direction. In other embodiments, the curves can be out of phase or in opposite phase as discussed above. In the embodiment shown, the curves are confined to two dimensions such that the actuator can be contained within a plane. In other embodiments, the curves encompass three dimensions. In the embodiment shown, the electrodes are positioned parallel to each other in the same plane. In a further embodiment, the curves are formed in three dimensions and the electrodes are spatially aligned such that the corresponding curves are proximate to each other in three-space. In the embodiment shown, the electrodes are nested such that a line drawn between two selected points on a first electrode of the pair intersects a second electrode of the pair. In an embodiment, when the serpentine plasma actuator is powered at least one plasma discharge is produced in the fluid. In an embodiment, each at least one plasma discharge induces at least one force in the fluid. In an embodiment, each of the at least one force is an EHD body force. In an embodiment, the at least one force creates turbulence in the fluid. In an embodiment, the at least one force generates one or more flow structures in the fluid as discussed above. In a particular embodiment, one or more CVPs are generated in the fluid, such as the CVPs shown in FIG. 1.

FIG. 3 shows a square serpentine plasma actuator in accordance with an embodiment of the subject invention. The embodiment shown includes a pair of electrodes, each having a number of turns to form a serpentine shape. In the embodiment shown, each of a plurality of turns in the top electrode corresponds to a corresponding plurality of turns in the bottom electrode. In the embodiment shown, the corresponding turns are in the same order and in phase with each other. Although the corresponding turns are not the same distance apart on each electrode, each corresponding turn is made in the same direction. In the embodiment shown, the electrodes are spatially aligned such that the corresponding turns are proximate to each other. In the embodiment shown, the varying distance between corresponding turns allows the electrodes to be nested. In the embodiment shown, the turns are confined to two dimensions such that the actuator can be contained within a plane. In other embodiments, the turns encompass three dimensions. In an embodiment, when the serpentine plasma actuator is powered at least one plasma discharge is produced in the fluid as discussed above in relation to FIG. 2.

In an embodiment, a serpentine plasma actuator is provided having at least three electrodes. In an embodiment, the at least three electrodes are powered in phased pairs, as discussed above. In an embodiment, a multi-layer arrangement of electrodes is used in which electrodes are arranged in a plurality of layers. In an embodiment, each layer of electrodes is separated by an insulating material. For example, in an embodiment, several layers of a dielectric substrate are formed, each layer enveloping at least one electrode. In an embodiment, such a multibarrier plasma actuator (MBPA) produces greater mixing of the fluid. In an embodiment, a more uniform mixture of the fluid results. In an embodiment, use of a MBPA produces more rapid mixing of the fluid. In an embodiment, a certain uniformity of the fluid is reached in less time. In an embodiment, a certain stoichiometric ratio is reached in less time.

Figure 4:
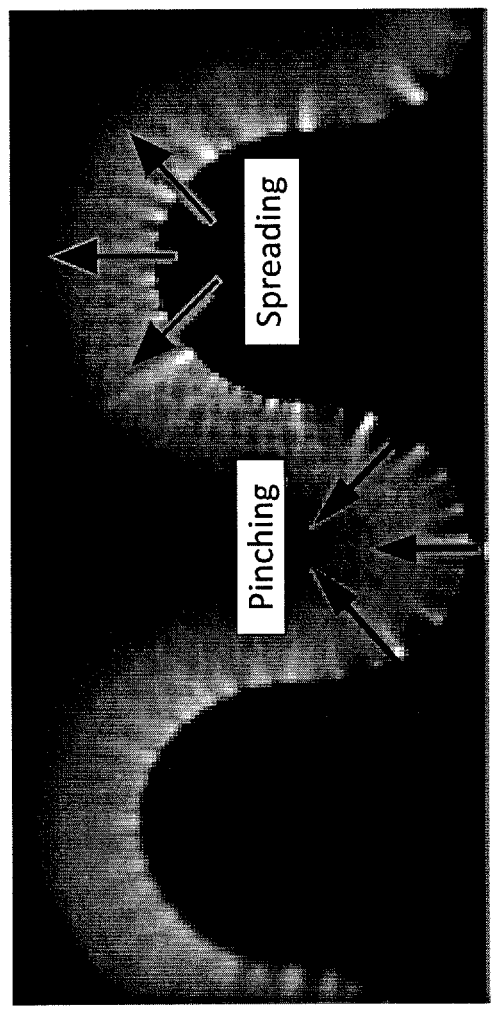
FIG. 4 depicts forces generated by a serpentine actuator in accordance with an embodiment of the subject invention.

FIG. 4 depicts forces anticipated from the use of a serpentine actuator in accordance with an embodiment of the subject invention. In an embodiment, the top electrode can be grounded and the bottom electrode can be powered to achieve a voltage potential. In an alternative embodiment, the bottom electrode can be powered and the top electrode can be grounded. In an alternative embodiment, both electrodes are powered to achieve the voltage potential. When the voltage potential is achieved, plasma discharges can be produced in a fluid proximate to the actuator. As discussed above plasma discharges can generate forces that act on the fluid. The arrows shown in FIG. 4 indicate anticipated forces produced by the depicted actuator. As shown, the anticipated forces alternately exert pinching (inward) and spreading (outward) forces on the fluid. In an embodiment, plasma actuators such as the plasma actuators described herein produce forces in three dimensions.

In a particular embodiment, the discharge is created in the fluid as the fluid passes over the actuator and the fluid receives forces from a plurality of directions such that the fluid collides and mixes. In an embodiment, the forces produce pinching (inward) and/or spreading (outward) effects on the fluid as it passes over the actuator. In an embodiment, the actuator produces forces in the direction of the fluid flow over the actuator (streamwise), orthogonal to the direction of fluid flow and parallel to the surface of the actuator (crosswise), and/or orthogonal to the direction of fluid flow and perpendicular to the actuator surface (surface normal). In an embodiment, the actuator produces both streamwise and crosswise forces. In another embodiment, the actuator produces both streamwise and surface normal forces. In yet another embodiment, the actuator produces both crosswise and surface normal forces. In a further embodiment, the actuator produces streamwise, crosswise, and surface normal forces. The paper by Roy S. and Chin-Cheng Wang, *Bulk flow modification with horseshoe and serpentine plasma actuators*, J. Phy. D: Appl. Phys. 42 (2009) describes simulations of flows produced by such dielectric barrier plasma actuators and is incorporated herein by reference in its entirety. In a further embodiment, the forces generate one or more flow structures in the fluid, such as the vortical and other flow structures discussed above.

Figure 5:
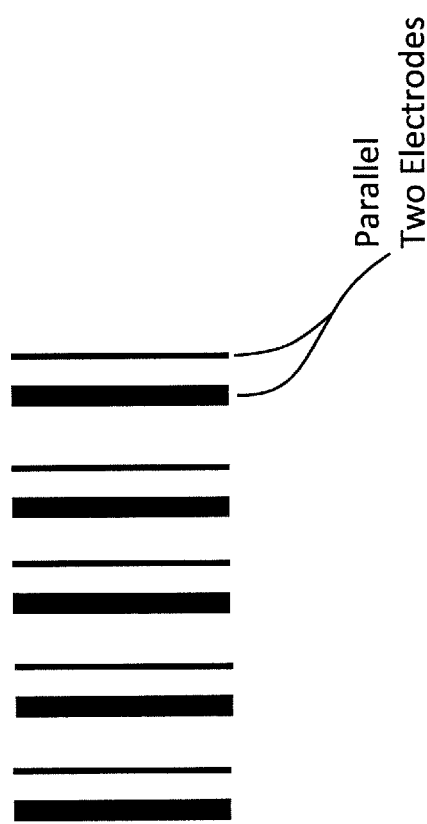
FIG. 5 shows parallel electrode pairs in a plasma actuator in accordance with an embodiment of the subject invention.

FIG. 5 shows parallel electrode pairs in a plasma actuator in accordance with an embodiment of the subject invention. In the embodiment shown, a plurality of pairs of electrodes is provided, wherein each pair of electrodes is aligned parallel to the others. In an embodiment, when one or more of the plurality of pairs of electrodes are powered a plasma discharge is produced in a fluid, as discussed above. In an embodiment, the fluid passes between the plurality of pairs of electrodes. In an embodiment, the fluid passes between the electrodes of a pair of electrodes of the plurality. In an embodiment, the fluid passes between the electrodes of one or more pairs of the plurality. In an embodiment, the fluid passes over the plurality of pairs of electrodes. In an embodiment, a plasma discharge is produced for each of the plurality of pairs of electrodes. In an embodiment, one or more of the plurality of pairs or electrodes are powered in parallel (i.e. at the same time). In an embodiment, one or more of the plurality of electrodes are powered in series (i.e. at different times). In an embodiment, subsets of the plurality of pairs of electrodes are powered in timed phases. In an embodiment, each plasma discharge induces at least one force in the fluid. In an embodiment, each of the at least one force is an EHD body force. In an embodiment, the at least one force creates turbulence in the fluid. In an embodiment, the at least one force generates one or more flow structures in the fluid as discussed above.

Figure 6:
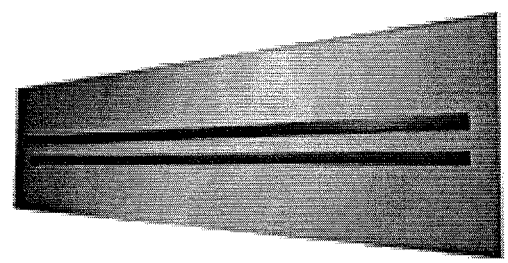
FIG. 6 shows a pair of parallel electrodes in a plasma actuator in accordance with an embodiment of the subject invention.

FIG. 6 shows a single pair of parallel electrodes in a plasma actuator in accordance with an embodiment of the subject invention. In an embodiment, when the pair of electrodes are powered a plasma discharge is produced in a fluid, as discussed above. In an embodiment, the fluid passes between the electrodes of the pair of electrodes. In an embodiment, the fluid passes over the pair of electrodes. In an embodiment, the fluid passes around the pair of electrodes. In an embodiment, a plurality of plasma discharges is produced by powering the pair of electrodes over time. In an embodiment, the pair of electrodes is powered in timed phases. In an embodiment, each plasma discharge induces at least one force in the fluid. In an embodiment, each of the at least one force is an EHD body force. In an embodiment, the at least one force creates turbulence in the fluid. In an embodiment, the at least one force generates one or more flow structures in the fluid as discussed above.

Additional embodiments of the invention can involve other electrode structures incorporating curvatures or angles, such as triangle, square, or angle, with respect to the longitudinal dimension of the electrode pattern. Referring to FIGS. 7A and 7B, electrode patterns incorporating such curvatures are shown. FIG. 7A illustrates an electrode pattern having a cross-section, perpendicular to the longitudinal dimension, as shown in the right side of FIG. 7A, where the longitudinal dimension of the electrode pattern incorporates a curvature, as shown, in the top view of the longitudinal dimension, on the left side of FIG. 7A. FIG. 7B shows an electrode pattern having a cross-section as shown in the right side of FIG. 7B, where the longitudinal dimension of the electrode pattern incorporates a curvature, as shown on the left side of FIG. 7B.

The arrows in FIGS. 7A and 7B show the direction of the flow when looking at a cross-section cut from the top to bottom of the respective electrode pattern with the ground electrode being on the inside of the curvature.

Figure 8A:
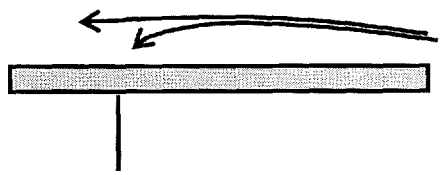
FIGS. 8A-8B show the particular electrode shape of FIGS. 7A-7B used in an inverted configuration in accordance with an embodiment of the subject invention.
Figure 8A:
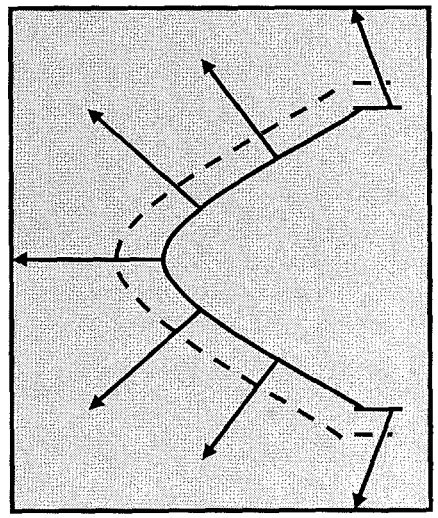
Figure 8B:
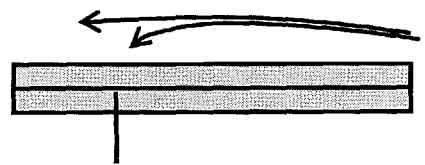
Figure 8B:
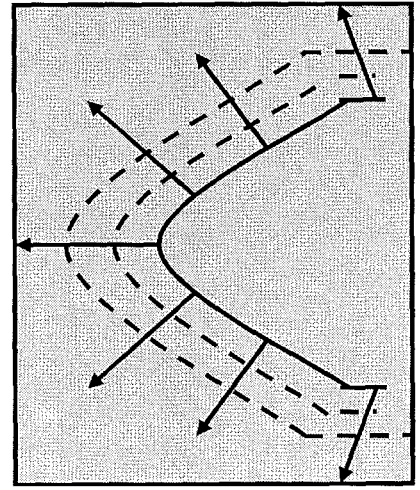

FIGS. 8A and 8B show the electrode patterns of FIGS. 7A and 7B, respectively, with the ground electrode being on the outside of the curvature in FIG. 8A and the electrode driven to create a body force from the inner electrode to the outer electrode. The arrows shown in FIGS. 8A and 8B show the flow created by driving the electrode structures in this manner.

Figure 9:
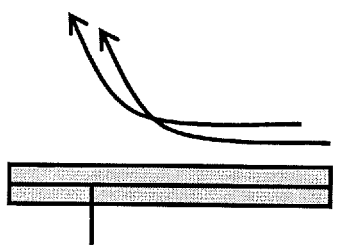
FIG. 9 shows a serpentine turbulator actuator in accordance with an embodiment of the subject invention.
Figure 9:
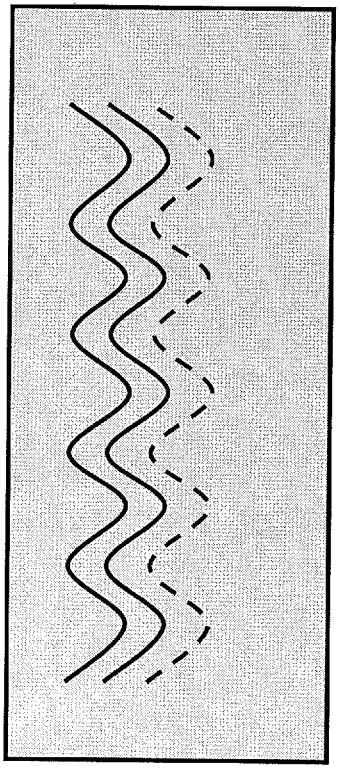

FIG. 9 shows an electrode structure having a serpentine turbulator design in the longitudinal dimension. The arrows on the right side show the flow for a cross-section cut from top to bottom where the electrodes are driven to produce a body force from the outer electrode to the inner electrode with respect to one of the curved sections.

Figure 10:
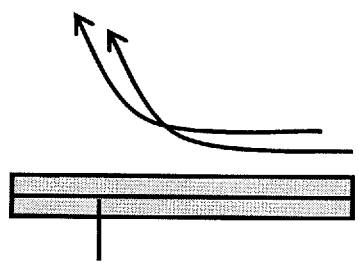
FIG. 10 shows another serpentine turbulator actuator in accordance with another embodiment of the subject invention.
Figure 10:
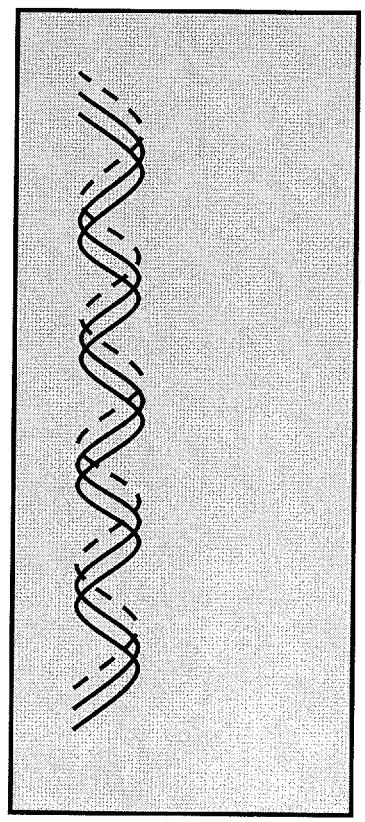

FIG. 10 shows another embodiment having a serpentine turbulator design in the longitudinal dimension where the electrodes have a different orientation from the electrode pattern in FIG. 9. The arrows show the flow for a cross-section out from top to bottom at a location where the body force is away from the surface.

Figure 11:
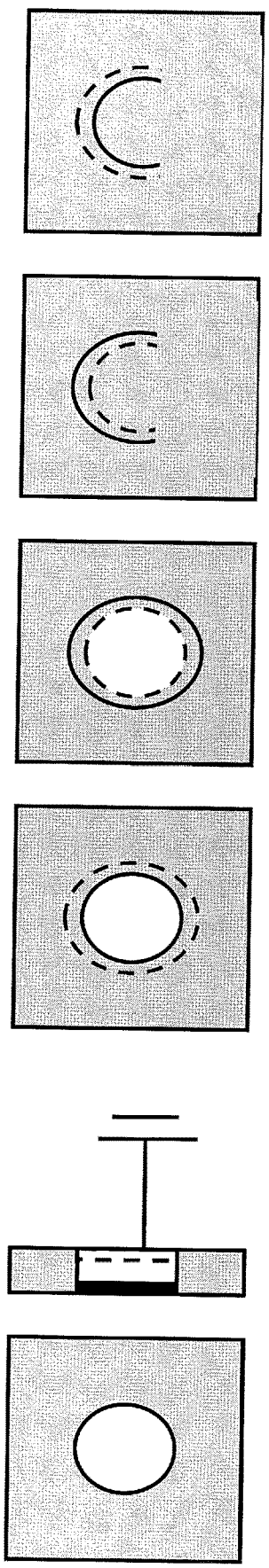
FIG. 11 shows various specific embodiments of the subject invention.

A variety of curvatures can be implemented in accordance with the subject invention. FIG. 11 shows additional embodiments of electrode patterns incorporating curvatures in the longitudinal dimension of the electrodes, including an electrode pattern surrounding an aperture in the substrate and an electrode pattern in the shape of a half circle. Other shapes include, but are not limited to, angles, triangles, rectangles, polygons, and other shapes that vary from straight.

Figure 12B:
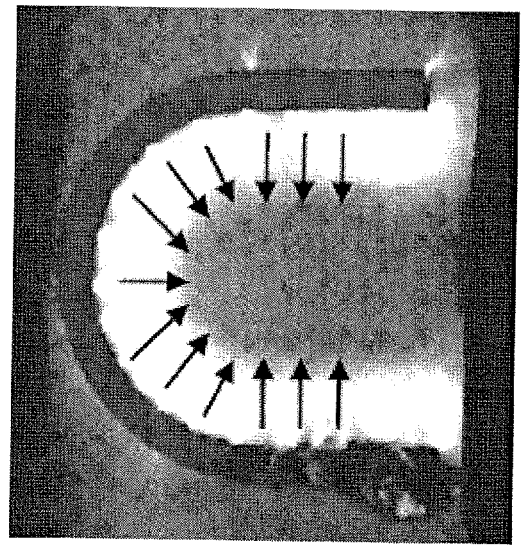
FIGS. 12A-12B show an embodiment having a horseshoe shaped electrode pattern.
Figure 12A:
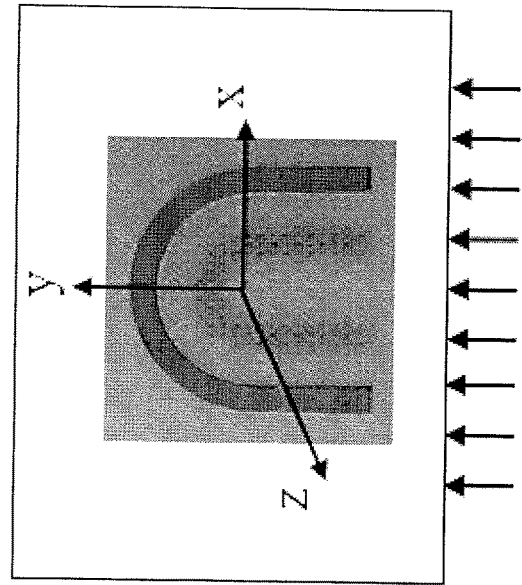
Figure 14A:
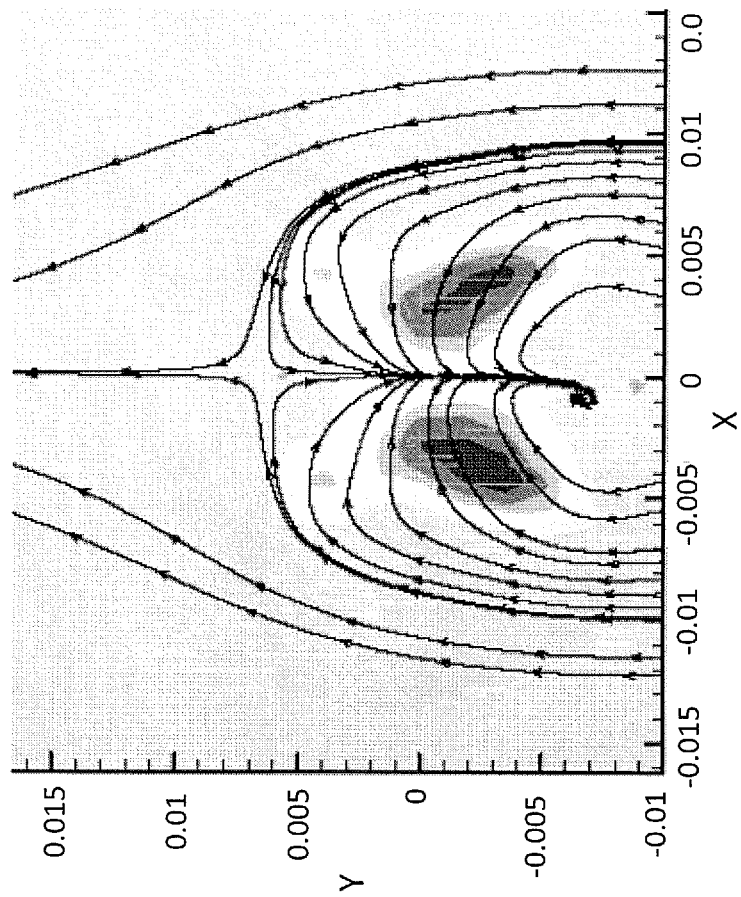
FIGS. 14A-14C show data illustrating the operation of the embodiment of FIG. 12A.
Figure 13:
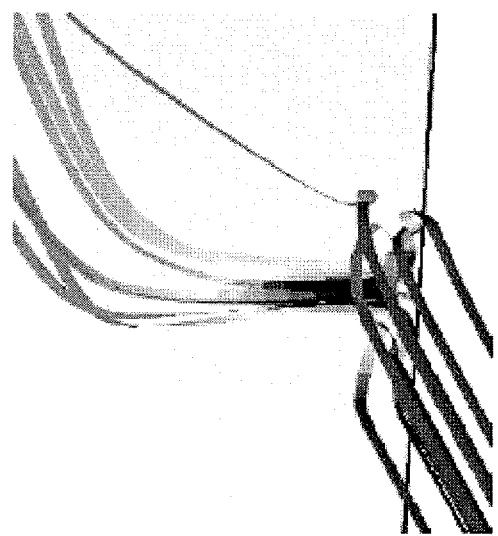
FIG. 13 shows a flow pattern for the embodiment of FIG. 12A.
Figure 14B:
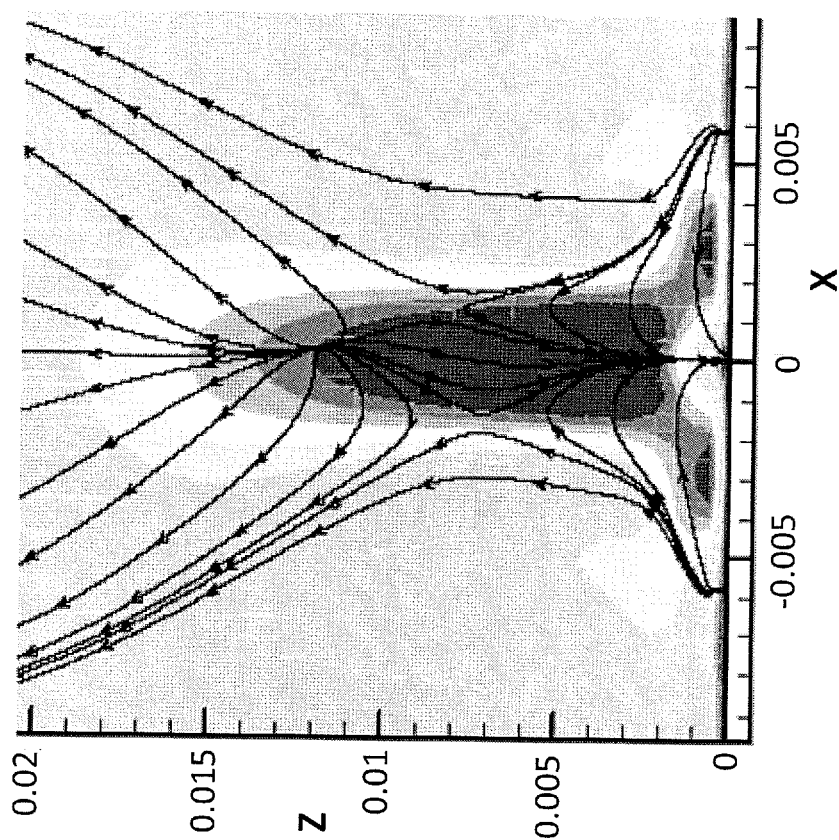
Figure 14C:
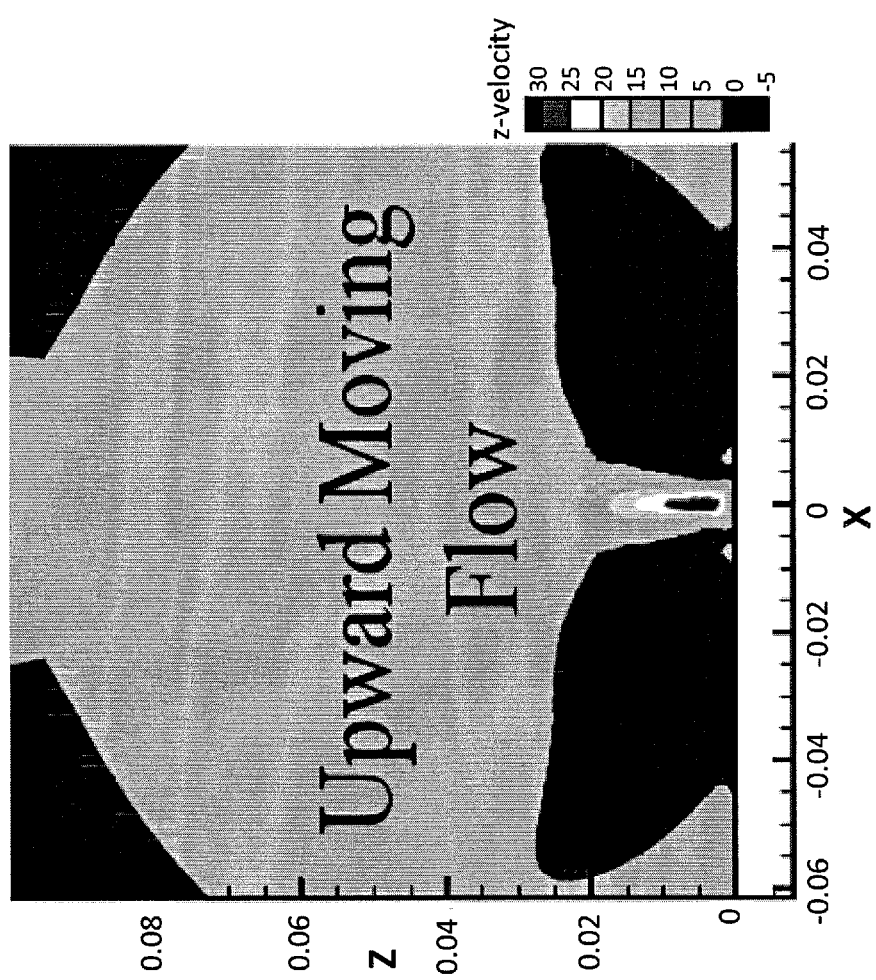

FIGS. 12A and 12B show an electrode pattern similar to the pattern in Figure A and the corresponding glow pattern, respectively. The electrode pattern of FIG. 12A is driven to create the body force from the outer electrode to the inner electrode. FIG. 13 shows flow traces, and FIGS. 14A-14C show data illustrating an upward body force produced by this electrode pattern when driven in this matter where the summation of the flow-force creates an upward flow force.

The electrode patterns discussed above can be used to create mixing in a fluid. In an embodiment, the electrodes are used to produce a plasma discharge in the fluid as discussed above. In an embodiment, the discharge is created in the fluid as the fluid passes over the electrodes and the fluid receives forces from a plurality of directions such that the fluid collides and mixes. In an embodiment, the forces produce pinching (inward) and/or spreading (outward) effects on the fluid. In a further embodiment, the forces generate one or more flow structures in the fluid, such as the vertical and other flow structures discussed above.

In an embodiment of the subject invention, one or more plasma actuators as described herein are used to mix air, fuel, and/or other fluids in a mixing chamber. In an embodiment, at least one of the one or more plasma actuators are positioned on at least one surface of the mixing chamber. In an embodiment, at least one of the one or more plasma actuators is otherwise positioned in or near the mixing chamber. For example, in an embodiment, at least one of the one or more plasma actuators is positioned near and inlet or outlet to the mixing chamber.

In an embodiment, solids are mixed into one or more fluids in such a mixing chamber. In an embodiment, properties of portions of a fluid are homogenized in such a mixing chamber. For example, in an embodiment, heat is dispersed throughout the fluid.

In an embodiment, the use of such plasma actuators results in a more uniform mixture of the fluid. In an embodiment, the use of such plasma actuators results in a more rapid mixing of the fluid. In an embodiment, the use of such plasma actuators results in a certain uniformity of the fluid being reached in less time. In an embodiment, the use of such plasma actuators results in a certain stoichiometric ratio of the fluid being reached in less time. In an embodiment, such plasma actuators are used to mix air and fuel before combustion. In an embodiment, the use of such plasma actuators results in more efficient combustion of the mixture. In an embodiment, higher performance is gained from such combustion. In an embodiment, fewer by-products are produced by such combustion. In an embodiment, at least one dimension of the mixing chamber can be decreased without significant loss of uniformity or speed or significantly changing the stoichiometric ratio of the resulting mixture. In an embodiment, a length of the mixing chamber can be decreased without significant loss of uniformity or speed or significantly changing the stoichiometric ratio of the resulting mixture.

FIG. 15A shows a standard air fuel mixing chamber where air and fuel are mixed to maintain a certain stoichiometric ratio. In the embodiment shown, structures on the chamber walls are used to generate turbulence in the air and fuel, thereby mixing the air and fuel. In the embodiment shown, the structures are positioned on opposing walls of the chamber, wherein the opposing walls are parallel to the direction of fluid flow. Five (5) different modifications to the standard mixing chamber are shown in FIGS. 15B-15F. Such modifications can also be applied to mix other fluids, solids, and/or properties of fluids. In an embodiment, such modified mixing chambers are used to mix reagents for a chemical reaction. In an embodiment, such modified mixing chambers are used to disperse particulates, ions, or other solids in at least one fluid. In an embodiment, such modified mixing chambers are used to disperse moisture, heat, pressure, pH, or other properties within at least one fluid. In an embodiment, by using one or more plasma actuators as described below, flow rates can be controlled. In an embodiment, by using one or more plasma actuators as described below, a certain stoichiometric ratio can be maintained. Though FIGS. 15A-15F show cases where fluid flows in through an inlet at the bottom of the chamber and out through an outlet (not depicted) at the top of the chamber, embodiments of the subject invention are not limited thereto. Further embodiments may include an inlet and/or an outlet at any location throughout the chamber. That is, the inlet need not be at the bottom of the chamber and the outlet need not be at the top of the chamber. For example, embodiments of the subject invention may include an inlet at the top or at an upper portion of the chamber and an outlet at the bottom or at a lower portion of the chamber. Embodiments of the subject invention may include an inlet and/or an outlet at a side or at a middle portion of the chamber. In certain embodiments, an inlet can also be used as an outlet.

In FIG. 15B, the mixing chamber has been modified by positioning a pair of plasma actuators on opposing surfaces of the mixing chamber. As shown, as a fluid passes over each actuator turbulence is created in the fluid thereby mixing the fluid. In this embodiment, the structures along the chamber walls have been eliminated as they are no longer required for mixing the fluid. In other embodiments, one or more plasma actuators are combined with such structures to further enhance mixing. Illustrative examples are described below.

In FIG. 15C, the opposing sides of the mixing chamber incorporate angled surfaces that broaden the chamber and a plasma actuator is positioned on each angled surface. In an embodiment, the plasma actuators are positioned at or near a point where the chamber begins to broaden. In an embodiment, the length of the mixing chamber is decreased. In an embodiment, the performance of the mixing chamber is maintained despite the decreased length of the chamber.

The mixing chamber of FIG. 15D, resembles the mixing chamber of FIG. 15A, but a plasma actuator has been added to the top of each structure to enhance mixing as shown. In an embodiment, the length of the mixing chamber is decreased. In an embodiment, the performance of the mixing chamber is maintained despite the decreased length of the chamber.

In FIG. 15E, the opposing sides of the mixing chamber incorporate angled surfaces that narrow the chamber and a plasma actuator is positioned on each angled surface. In an embodiment, the plasma actuators are positioned at or near a point where the chamber stops narrowing. In an embodiment, the length of the mixing chamber is decreased. In an embodiment, the performance of the mixing chamber is maintained despite the decreased length of the chamber.

The mixing chamber of FIG. 15F, resembles the mixing chamber of FIG. 15D, but the opposing structures have sloped bottoms as opposed to squared bottoms. Other suitable structure shapes are known in the art and can be used with the subject invention. In an embodiment, the length of the mixing chamber is decreased. In an embodiment, the performance of the mixing chamber is maintained despite the decreased length of the chamber.

Figure 16A:
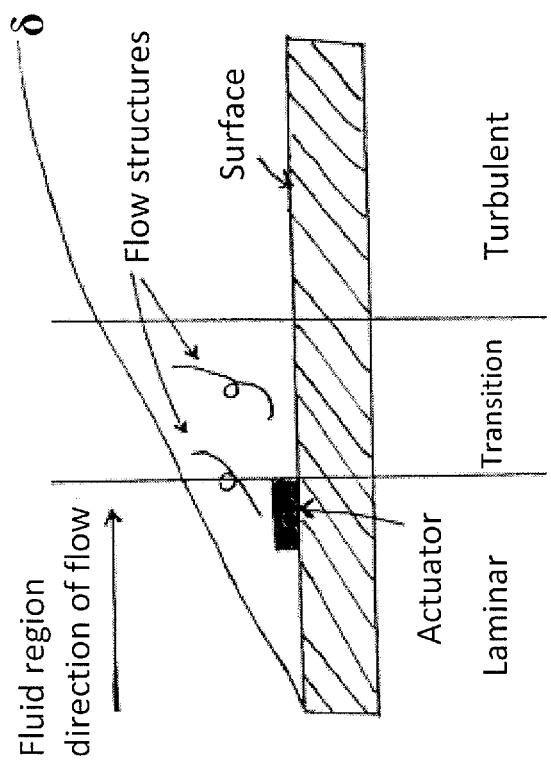
FIGS. 16A and 16B show apparatus for inducing external flow over a flat plate and anticipated results in accordance with embodiments of the subject invention.
Figure 16B:
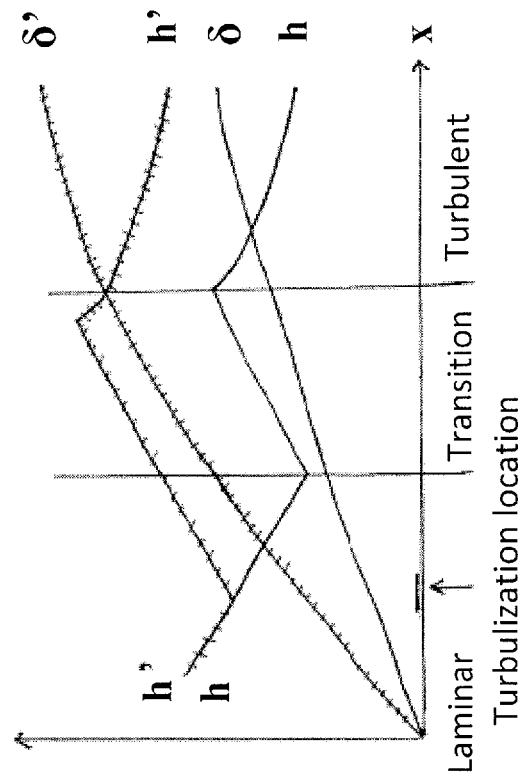

In an embodiment of the subject invention, one or more plasma actuators as described herein can be used to improve convective heat transfer through improvement in mixing. Illustrative examples are shown in FIGS. 16A and 16B. In the embodiments shown, a fluid passes over a surface comprising a plasma actuator. In an embodiment, such an apparatus is used for external flow over a flat plate. As shown, as the fluid passes over the actuator turbulence is created in the fluid causing the flow regime to change from laminar to transition to turbulent. In an embodiment, the turbulence causes mixing of the fluid. In the embodiments shown, the surface is heated and the mixing of the fluid transfers heat from portions of the fluid near the surface to portions of the fluid further from the surface.

As shown in FIG. 16A, one or more flow structures can be produced in the fluid such as the vortical or other flow structures discussed above. In addition, the action of the actuator can increase the thickness of momentum boundary layer d, thus facilitating heat transfer to portions of the fluid further from the surface.

FIG. 16B shows a characterization for such an apparatus. In the graph shown, the horizontal axis x represents horizontal position with respect to the surface and actuator and the vertical axis represents the relative magnitude of h and d at that position, wherein h and d respectively represent convective heat transfer coefficient and momentum boundary layer thickness as the fluid passes over a heated surface without plasma actuation, while h' and d' (hashed curves) respectively represent anticipated convective heat transfer coefficient and momentum boundary layer thickness as the fluid passes over the same heated surface with plasma actuation. As shown, the momentum boundary layer thickness can be increased by use of one or more plasma actuators. Further, such actuators can increase the convective heat transfer coefficient of a fluid. In FIG. 16B, with the action of the actuator (hashed curve), the convective heat transfer coefficient increases more rapidly and reaches a higher peak.

In an embodiment, a method of inducing mixing in a fluid is provided including providing one or more actuators, such the actuators described herein, near the fluid and applying at least one voltage potential to the one or more actuators to produce a plasma discharge, which induces mixing in the fluid. In a further embodiment, the at least one voltage potential is applied to the one or more actuators in timed phases. In a particular embodiment, the timing of the phases is calculated by one or more suitably programmed computers. In a further embodiment, the timing is calculated based on a determined velocity of the fluid. Various means of determining the velocity of the fluid are know in the art and can be incorporated into embodiments of the invention. For example, pressure transducers can be used to measure differences in pressure in the fluid. In a particular embodiment, such pressure differences are used to calculate flow velocities in the fluid. In other embodiments, other sensors can be used to measure velocities, such as anemometers, hot-wire anemometers, acoustic flow meters, laser velocimeters, among other devices. Computer-executable instructions for performing these steps can be embodied on one or more computer-readable media. In an embodiment, the one or more suitably programmed computers incorporate a processing system as described below.

In an embodiment, a device for mixing combustion materials can include a chamber having an inlet, at least one pair of electrodes provided on or proximate an inner surface of the chamber, and a power supply configured to apply a voltage potential across the pair of electrodes. The chamber can also have an outlet, though the inlet may also be used as an outlet in certain embodiments. The pair of electrodes can be provided on or proximate any portion of the inner surface of the chamber. Referring again to FIGS. 15B-15F, examples of embodiments of the subject invention are depicted in which at least one pair of electrodes is provided on or proximate an inner surface of a combustion chamber. Though FIGS. 15B-15F show cases where fluid flows in through an inlet at the bottom of the chamber and out through an outlet (not depicted) at the top of the chamber, embodiments of the subject invention are not limited thereto. Further embodiments may include an inlet and/or an outlet at any location throughout the chamber. That is, the inlet need not be at the bottom of the chamber and the outlet need not be at the top of the chamber. For example, embodiments of the subject invention may include an inlet at the top or at an upper portion of the chamber and an outlet at the bottom or at a lower portion of the chamber. Embodiments of the subject invention may include an inlet and/or an outlet at a side or at a middle portion of the chamber. In certain embodiments, an inlet can also be used as an outlet.

In an embodiment, at least a portion of the chamber can have a tubular cross-section, and the pair of electrodes can be provided around the entire perimeter of the inner surface of the tubular cross-section of the chamber. The tubular cross-section can be, for example, circular, oval, square, pentagonal, hexagonal, rectangular, or other tubular cross-sectional shapes. In an embodiment, the maximum dimension (i.e., maximum length in any direction) of the cross-section of the chamber can be 10 cm. In an embodiment, the cross-sectional area of the chamber can be less than or equal to 100 cm$^2$. In a further embodiment, the cross-sectional area of the chamber can be less than or equal to 50 cm$^2$. In a further embodiment, the cross-sectional area of the chamber can be less than or equal to 80 cm$^2$. In a further embodiment, the cross-sectional area of the chamber can be less than or equal to 70 cm$^2$. In a further embodiment, the cross-sectional area of the chamber can be less than or equal to 60 cm$^2$.

In an embodiment, the pair of electrodes can be provided around at least 90% of the perimeter of the inner surface of the tubular cross-section of the chamber. In further embodiments, the pair of electrodes can be provided around at least any of the following percentages of the perimeter of the inner surface of the of the tubular cross-section of the chamber: 85%, 80%, 75%, 70%, 65%, 60%, 55%, 50%, 45%, 40%, 35%, 30%, 25%, or 20%.

At least one electrode of the pair of electrodes can have one or more turns formed therein. The pair of electrodes can be configured such that when the voltage potential is applied across the pair of electrodes when the pair of electrodes is positioned near a fluid, a plasma discharge is produced in the fluid. When the plasma discharge is produced in the fluid, one or more three-dimensional flow structures can be generated in the fluid that induce mixing of the fluid. At least one of the one or more three-dimensional flow structures can include a vortical flow structure. In a further embodiment, at least one of the one or more three-dimensional flow structures can include a counter-rotating vortex pair. In an embodiment, at least three three-dimensional flow structures can be generated in the fluid, and all of the generated three-dimensional flow structures can be non-coplanar with each other. The fluid can include two or more liquids to be mixed, two or more gases to be mixed, and/or one or more liquids and one or more gases to be mixed, such as air and a fuel such as, e.g., methane.

Figure 17:
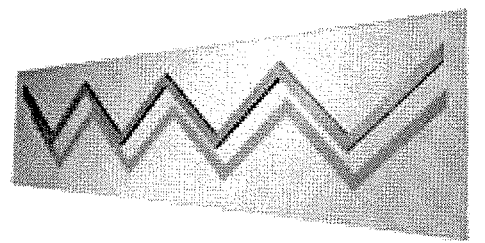
FIG. 17 shows a pair of electrodes in a triangular plasma actuator in accordance with an embodiment of the subject invention.

In an embodiment, at least one electrode of the pair of electrodes can have a plurality of turns formed therein. Each electrode of the pair of electrodes can have one or more turns formed therein. In a further embodiment, each electrode of the pair of electrodes has a plurality of turns formed therein. A turn can be, for example, an entire curve of the serpentine shape depicted in FIG. 2, an entire step of the square shape depicted in FIG. 3, or an entire "V" shape of the triangular shape depicted in FIG. 17. For example, the pair of electrodes can have a serpentine, square, or triangular shape as depicted in FIGS. 2, 3, and 17, respectively. A turn can also be, for example, a curve, step, or "V" in a similarly-shaped configuration of an electrode pair. In an embodiment, the plurality of turns formed in the first electrode of the pair can correspond to the plurality of turns formed in the second electrode. Each of the plurality of turns formed in the first electrode can be positioned on the first electrode in the same order as the corresponding turn in the second electrode. In a further embodiment, each of the plurality of turns formed in the first electrode can be made at the same or approximately the same angle as the corresponding turn in the second electrode.

In certain embodiments, each electrode of the pair of electrodes can have a serpentine shape having at least two periods. A period of the serpentine shape is defined as a period of the wave structure of the serpentine shape. That is, a period of the serpentine shape includes one full wave and goes from a point on a wave of the serpentine shape to the same point on the next wave in the serpentine shape (e.g., from one wave crest to the next wave crest).

In an embodiment, the electrodes of the pair of electrodes can be evenly spaced. That is, a distance between the first electrode and the second electrode can remain constant or approximately constant along the length of both electrodes (i.e., as a function of both electrode lengths). In an alternative embodiment, a distance between the first electrode and the second electrode can vary along the length of both electrodes (i.e., as a function of both electrode lengths).

In an embodiment, the device can be adapted to receive a fluid via the inlet wherein at least a portion of the fluid received via the inlet is proximate the pair of electrodes, and the pair of electrodes can be configured such that when the voltage potential is applied across the pair of electrodes when at least a portion of the fluid is proximate the pair of electrodes, a plasma discharge is produced in the fluid. When the plasma discharge is produced in the fluid, one or more three-dimensional flow structures can be generated in the fluid that induce mixing of the fluid. At least one of the one or more three-dimensional flow structures can include a vortical flow structure. At least one of the one or more three-dimensional flow structures can include a counter-rotating vortex pair. In an embodiment, a first three-dimensional flow structures can be at an angle (i.e., non-parallel) with a second three-dimensional flow structure.

In an embodiment, a method of mixing a fluid can include: providing at least one pair of electrodes; flowing a fluid in a fluid flow direction across one or more of the pair(s) of electrodes; and applying a voltage potential across one or more of the pair(s) of electrodes, such that a plasma discharge is produced in the fluid. In a specific embodiment, the electrodes are structured and the fluid flow with regard to the electrodes such that when the plasma discharge is produced, turbulence is generated in the fluid that mixes the fluid by pushing a first portion of the fluid in a first direction and a second portion of the fluid in a second direction, such that the first direction and the second direction are non-parallel. A third portion of the fluid can also be pushed in a third direction where the third direction is non-parallel with the first direction and non-parallel with the second direction. In a specific embodiment, the first direction can be non-parallel to the fluid flow direction, the second direction can be non-parallel to the fluid flow direction and non-parallel to the first direction, and the third direction can be parallel to the fluid flow direction. Additional embodiments, such as shown in FIG. 1, can push the fluid in many different directions.

At least one electrode of the pair of electrodes can have one or more turns formed therein. In an embodiment, each electrode of the pair of electrodes has a plurality of turns formed therein. The plurality of turns formed in the first electrode can correspond to the plurality of turns formed in the second electrode. In a further embodiment, each of the plurality of turns formed in the first electrode can be positioned on the first electrode in the same order as the corresponding turn in the second electrode.

In certain embodiments, each electrode of the pair of electrodes can have a serpentine shape having at least two periods.

In an embodiment, the electrodes of the pair of electrodes can be evenly spaced. That is, a distance between the first electrode and the second electrode can remain constant or approximately constant along the length of both electrodes (i.e., as a function of both electrode lengths). In an alternative embodiment, a distance between the first electrode and the second electrode can vary along the length of both electrodes (i.e., as a function of both electrode lengths).

In an embodiment, a method of inducing mixing in a fluid can include: providing at least one pair of electrodes; flowing fluid in a fluid flow direction across the pair of electrodes; and applying a voltage potential across the pair of electrodes, such that a plasma discharge is produced in the fluid. When the plasma discharge is produced, turbulence can be generated in the fluid that mixes the fluid. The voltage potential can be applied in a duty cycle such that in each cycle of the duty cycle the voltage potential is applied for one or more portions of the cycle and not applied for the other portions of the cycle. For example, the voltage potential can be applied as a repeating cycle of one or more pulses. The duration of the one or more portions of the cycle in which the voltage potential is applied can be any internal range within the endpoints of 20% of the duration of the cycle to 90% of the duration of the cycle. For example, the duration of the one or more portions of the cycle in which the voltage potential is applied can be from 20% of the duration of the cycle to 50% of the duration of the cycle. In an embodiment, the duration of the one or more portions of the cycle in which the voltage potential is applied can be about 25% of the duration of the cycle. In a particular embodiment, a 5 kHz, 10 kV (peak-to-peak) voltage potential can be applied in a pulsing duty cycle in which the duration of the one or more portions of the cycle the voltage potential is applied is about 25% of the duration of the cycle.

The plasma discharge can produce turbulence that can mix the fluid by pushing a first portion of the fluid in a first direction and a second portion of the fluid in a second direction, such that the first direction and the second direction are non-parallel. In a further embodiment, when the plasma discharge is produced, the turbulence generated in the fluid can mix the fluid by pushing a third portion of the fluid in a third direction. The first direction can be non-parallel to the fluid flow direction, the second direction can be non-parallel to the fluid flow direction and non-parallel to the first direction, and the third direction can be parallel to the fluid flow direction.

At least one electrode of the pair of electrodes can have one or more turns formed therein. In an embodiment, each electrode of the pair of electrodes has a plurality of turns formed therein. The plurality of turns formed in the first electrode can correspond to the plurality of turns formed in the second electrode. In a further embodiment, each of the plurality of turns formed in the first electrode can be positioned on the first electrode in the same order as the corresponding turn in the second electrode.

In certain embodiments, each electrode of the pair of electrodes can have a serpentine shape having at least two periods.

In an embodiment, the electrodes of the pair of electrodes can be evenly spaced. That is, a distance between the first electrode and the second electrode can remain constant or approximately constant along the length of both electrodes (i.e., as a function of both electrode lengths). In an alternative embodiment, a distance between the first electrode and the second electrode can vary along the length of both electrodes (i.e., as a function of both electrode lengths).

In an embodiment, a method of mixing at least two fluids can include: providing a first fluid and a second fluid to a chamber having an inlet, wherein the chamber comprises a pair of electrodes on or proximate an inner surface of the chamber; and applying a voltage potential across the pair of electrodes to produce a plasma discharge in at least one of the fluids, wherein when the plasma discharge is produced turbulence is generated that mixes the first fluid and the second fluid. The pair of electrodes can be provided on or proximate any portion of the inner surface of the chamber. In an embodiment, at least a portion of the chamber can have a tubular cross-section, and the pair of electrodes can be provided around the entire perimeter of the inner surface of the tubular cross-section of the chamber. In further embodiments, one or more pairs of electrodes can be placed around a portion of the perimeter of the inner surface of the tubular cross-section of the chamber, such that at least 50%, at least 70%, and/or at least 90% of the perimeter.

At least one electrode of the pair of electrodes can have one or more turns formed therein. The pair of electrodes can be configured such that when the voltage potential is applied across the pair of electrodes when the pair of electrodes is positioned near a fluid, a plasma discharge is produced in the fluid. When the plasma discharge is produced in the fluid, one or more three-dimensional flow structures can be generated in the fluid that induce mixing of the fluid. At least one of the one or more three-dimensional flow structures can include a vortical flow structure. In a further embodiment, at least one of the one or more three-dimensional flow structures can include a counter-rotating vortex pair.

In an embodiment, at least one electrode of the pair of electrodes can have a plurality of turns formed therein. Each electrode of the pair of electrodes can have one or more turns formed therein. In a further embodiment, each electrode of the pair of electrodes has a plurality of turns formed therein. A turn can be, for example, an entire curve of the serpentine shape depicted in FIG. 2, an entire step of the square shape depicted in FIG. 3, or an entire "V" shape of the triangular shape depicted in FIG. 17. For example, the pair of electrodes can have a serpentine, square, or triangular shape as depicted in FIGS. 2, 3, and 17, respectively. A turn can also be, for example, a curve, step, or "V" in a similarly-shaped configuration of an electrode pair. In an embodiment, the plurality of turns formed in the first electrode of the pair can correspond to the plurality of turns formed in the second electrode. Each of the plurality of turns formed in the first electrode can be positioned on the first electrode in the same order as the corresponding turn in the second electrode. In a further embodiment, each of the plurality of turns formed in the first electrode can be made at the same or approximately the same angle as the corresponding turn in the second electrode.

In certain embodiments, each electrode of the pair of electrodes can have a serpentine shape having at least two periods. A period of the serpentine shape is defined as a period of the wave structure of the serpentine shape. That is, a period of the serpentine shape includes on full wave and goes from a point on a wave of the serpentine shape to the same point on the next wave in the serpentine shape (e.g., from one wave crest to the next wave crest).

In an embodiment, the electrodes of the pair of electrodes can be evenly spaced. That is, a distance between the first electrode and the second electrode can remain constant or approximately constant along the length of both electrodes (i.e., as a function of both electrode lengths). In an alternative embodiment, a distance between the first electrode and the second electrode can vary along the length of both electrodes (i.e., as a function of both electrode lengths).

In an embodiment, the surface on or proximate which the electrodes are positioned can be smooth (surface compliant). In an alternative embodiment, the surface on or proximate which the electrodes are positioned can be raised. In certain embodiments, the actuator geometry can benefit from surface receptivity.

In an embodiment, the device can be adapted to receive a fluid via the inlet wherein at least a portion of the fluid received via the inlet is proximate the pair of electrodes, and the pair of electrodes can be configured such that when the voltage potential is applied across the pair of electrodes when at least a portion of the fluid is proximate the pair of electrodes, a plasma discharge is produced in the fluid. When the plasma discharge is produced in the fluid, one or more three-dimensional flow structures can be generated in the fluid that induce mixing of the fluid. At least one of the one or more three-dimensional flow structures can include a vortical flow structure. At least one of the one or more three-dimensional flow structures can include a counter-rotating vortex pair. In an embodiment, a first three-dimensional flow structures can be at an angle (i.e., non-parallel) with a second three-dimensional flow structure.

The first and second fluids can be any reasonable fluids to be mixed. In an embodiment, the chamber is a combustion chamber such that the first fluid is air and the second fluid is fuel.

In an embodiment, a method of mixing a fluid can include: providing at least one pair of electrodes, wherein each electrode of the pair of electrodes has a straight-line shape along a length of the electrode and is parallel to the other electrode of the pair of electrodes, wherein the pair of electrodes extend in an electrode direction; flowing a fluid in a fluid flow direction across the pair of electrodes; and applying a voltage potential across the pair of electrodes, such that a plasma discharge is produced in the fluid, wherein when the plasma discharge is produced turbulence is generated in the fluid that induces mixing in the fluid, wherein the fluid flow direction is perpendicular to the electrode direction. After passing over the pair of electrodes the fluid can flow in a direction that is raised by an angle with respect to the fluid flow direction. The fluid can flow in a direction that is raised by an angle, with respect to the fluid flow direction, within any possible range within the endpoints of zero degrees and 90 degrees. For example, the angle can be in a range of from 15° to 60° with respect to the fluid flow direction. In a further embodiment, the angle can be in a range of from 15° to 30° with respect to the fluid flow direction. In a further embodiment, the angle can be in a range of from 30° to 45° with respect to the fluid flow direction. In a further embodiment, the angle can be in a range of from 15° to 45° with respect to the fluid flow direction. In a further embodiment, the angle can be in a range of from 30° to 60° with respect to the fluid flow direction. In a further embodiment, the angle can be in a range of from 45° to 60° with respect to the fluid flow direction. In a further embodiment, the angle can be in a range of from 15° to 75° with respect to the fluid flow direction. In a further embodiment, the angle can be in a range of from 30° to 75° with respect to the fluid flow direction. In a further embodiment, the angle can be in a range of from 45° to 75° with respect to the fluid flow direction. In a further embodiment, the angle can he in a range of from 60° to 75° with respect to the fluid flow direction. In a particular embodiment, the angle can be about 30° with respect to the fluid flow direction.

Analysis

Plasma actuators such as those including the electrode pairs of embodiments of the subject invention have several advantages, including surface compliance, rapid response, lack of moving parts, and easy installation. Specifically, due to the lack of mechanical components the lifetime of the actuator can be significantly extended as compared to other mechanical/electromechanical devices such as synthetic jet actuators. Wang et al. reported numerical and experimental results for several different configurations of electrode pairs (*Three-dimensional effects of curved plasma actuators in quiescent air*, Journal of Applied Physics 109, 083305, 2011). The Wang et al. article is hereby incorporated by reference in its entirety.

Figure 18:
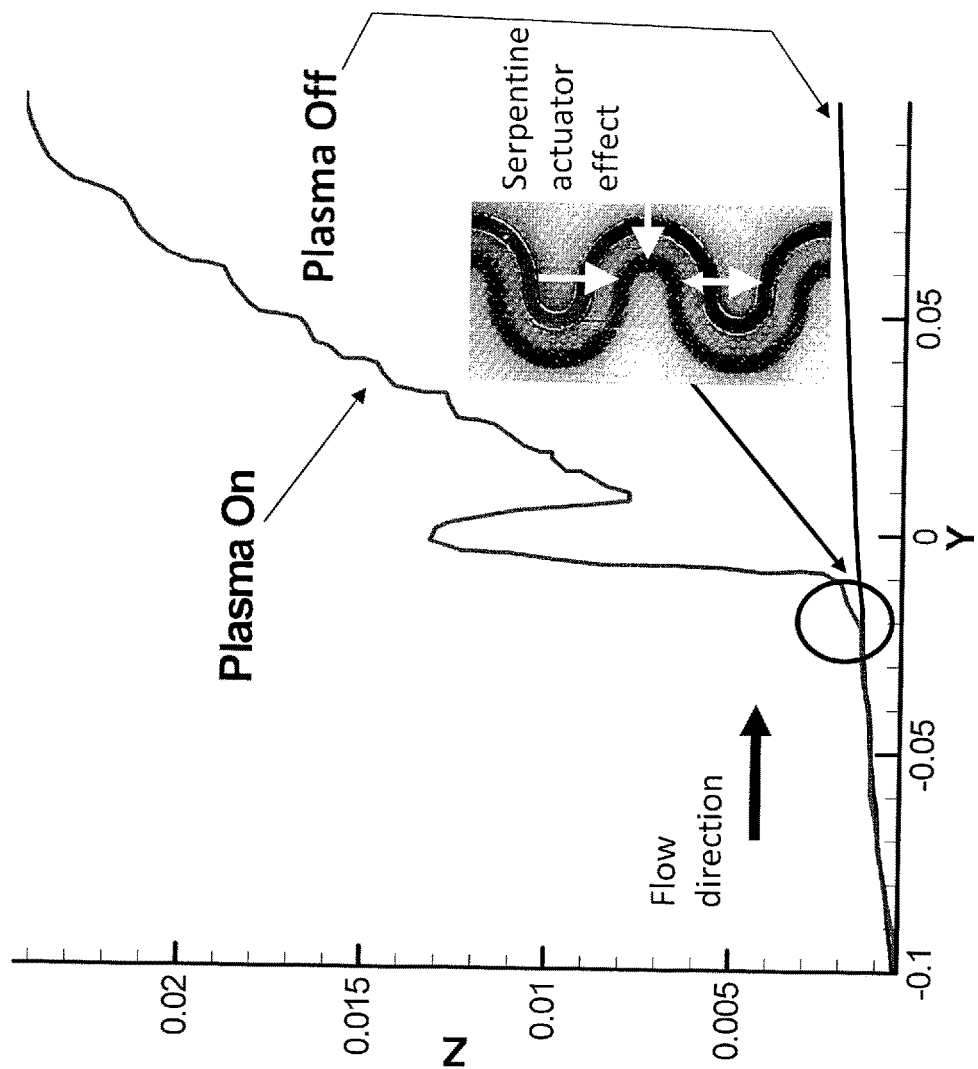
FIG. 18 shows a plot of an increase in boundary layer thickness induced by a serpentine plasma actuator in accordance with an embodiment of the subject invention.

FIG. 18 shows boundary layer thickness due to the plasma pinching effect, displaying a tenfold increase. The pinching effect is induced by a single decomposed half-wave which is also called plasma horseshoe actuator. The serpentine configuration can comprise, e.g., a set of horseshoe actuators connected side-by-side.

First-principles analysis of a plasma actuator provides for a high-fidelity numerical framework by which the physics of the problem may be examined. While it is feasible to incorporate a large number of species into the air chemistry model, it becomes computationally impractical to solve them for a dielectric barrier discharge (dbd) actuator operated in the khz frequency regime. A reasonable work around to this problem, is to solve a coupled system of plasma governing equations for relevant charged (and, if necessary, neutral) species along with Poisson's equation. This is generally referred to as the physics based first-principles analysis.

Low speed flows can be significantly influenced by plasma actuation. Two assumptions are generally made when numerically modeling a dbd actuator in a freestream flow: (1) the effect of the plasma manifests itself as a local body force on the working fluid and (2) the body force is primarily two-dimensional with negligible crosswise variation.

Examples of three-dimensional plasma actuators are the serpentine and horseshoe shaped configurations. These designs have been shown to have a three-dimensional nature to the plasma force which induces a mixing type flow.

Physics-based first-principles analysis can be used to resolve the plasma force vectors distribution over a flat surface for triangular (see FIG. 17), square (see FIG. 3), serpentine (see FIG. 2), and linear (see FIG. 6) plasma actuators. The geometric wavelength and amplitude of the actuators can also have an effect on the generated forces.

The three-dimensional drift-diffusion plasma governing equations as well as Navier-Stokes equations can be solved. A two-species basic model can be utilized to reduce the computational complexity of plasma chemistry in three-dimensions. The unsteady transport for ions and electrons is derived from the first-principles in the form of conservation of species continuity. The three-dimensional equations for determining concentrations of positive ions $n_i$ and electrons $n_e$ together with Poisson equation for electric field vector E (: $E_x$, $E_y$, $E_z$) are described in prior publication have been described (Wang and Roy, *Three-dimensional simulation of a micro plasma pump*, J. Phys. D: Appl. Phys. 42, 185206, 2009). The discharge is maintained using a Townsend ionization scheme. The charged species $\beta$(: e,i) is given by the drift-diffusion approximation as $n_\beta V_\beta = \text{sgn}(e) n_\beta \mu_\beta E - D_\beta \nabla n_\beta$. The following equations can then be derived:

$$\frac{\partial n_\beta}{\partial t} + \frac{\partial}{\partial x}\left\{\text{sgn}(e) n_\beta \mu_\beta E_x - D_\beta \frac{\partial n_\beta}{\partial x}\right\} + \quad (1)$$

$$\frac{\partial}{\partial y}\left\{\text{sgn}(e) n_\beta \mu_\beta E_y - D_\beta \frac{\partial n_\beta}{\partial y}\right\} +$$

$$\frac{\partial}{\partial z}\left\{\text{sgn}(e) n_\beta \mu_\beta E_z - D_\beta \frac{\partial n_\beta}{\partial z}\right\} = \alpha|\Gamma_e| - rn_i n_e$$

where $\mu_i = 1.45 \times 10^3/p$ (cm$^2$/sV) is the ion mobility, $\mu_e = 4.4 \times 10^5/p$ (cm$^2$/sV) is the electron mobility, $D_i$ and $D_e$ are the ion and electron diffusion coefficients calculated from the Einstein relation which is a function of ion and electron mobility as well as ion and electron temperature, i.e. $D_i = \mu_i T_i$ and $D_e = \mu_e T_e$.

The electrons are assumed in local thermal equilibrium (LTE), and the mean energy of the streamer head equilibrates in the presence of the electric field as a function of local (E/N). The electron temperature $T_e$ in the plasma is proportional to the ratio of the electric field to the density of neutral particles (E/N). The electron temperature in electron volts can be determined according to the expression, $T_e = (E/N)/(2\sigma\sqrt{2m_e/m_i})$, where s is the cross-section of electron-neutral collisions. Isothermal ions and neutrals can be considered.

A domain of (−0.0396:0.0396×−0.0216:0.0216×0.0: 0.024) m can be considered for the plasma simulation. A 2.4 mm thick Teflon dielectric can be used with a relative dielectric constant of 2. The mesh can consist of 89×49×41 nodes. The numerical model for solving DBD plasma governing equations uses an efficient finite element algorithm for solving partial differential equations (PDE) approximately. The solution methodology anchored in the in-house modular MIG flow code is based on the Galerkin Weak Statement (GWS) of the PDE which is derived from variational principles. An iterative sparse matrix solver, Generalized Minimal RESidual (GMRES), is utilized to solve the resultant stiff matrix. The fully implicit time stepping procedure along with the Newton-Raphson scheme is used for dealing with this nonlinear problem. The solution is assumed to have converged when the $L_2$ norms of all the normalized solution variables and residuals are below a convergence criterion of $10^{-3}$.

The time-average of the spatial distribution of electric force density, F (: $F_x$, $F_y$, $F_z$)=eqE, is introduced into the commercial Navier-Stokes solver, ANSYS Fluent, as a source term in the momentum equations using user defined functions (UDF). A second-order upwind spatial discretization method is used to solve for the induced flow on a computational mesh of 500,000 fluid volumes. Convergence is determined when the residual among the continuity and momentum equations are less than $10^{-3}$.

The linear, square, triangular, and serpentine actuators each consist of powered and grounded electrodes separated by a dielectric material. The plasma actuators are assumed to be flushed mounted at the center of a quiescent domain with dimensions (−0.1:0.1×−0.1:0.1×0:0.1) m. The right side of the domain (y=0.1 m) is considered to be the inlet, while the top (z=0.1 m) and left (y=−0.1 m) sides are outflow boundaries. The gauge pressure at the outlet boundaries is maintained at 0 Pa. Symmetry is considered on the domain's side walls (x±0.1 m), while no slip is enforced on the lower boundary (z=0.0 m). The thickness of the dielectric material and electrodes are neglected in the flow simulations. Air is considered to be the working fluid.

The three-dimensional effects of plasma actuators can be studied based on the four different shapes of linear, square, triangular, and serpentine. Referring to FIG. 4, upon applying a sufficient electric field to the exposed electrode to induce an electrical breakdown, an electro-hydrodynamic (EHD) body force can be generated along the electrode. This electric force can interact with bulk fluid and induce vortices locally and downstream of the actuator. FIG. 4 shows the serpentine actuator's pinching and spreading effects on the fluid in the xy-plane. Such effects can induce a three-dimensional swirling flow in the vicinity of the plasma region.

Figures 2, 19:
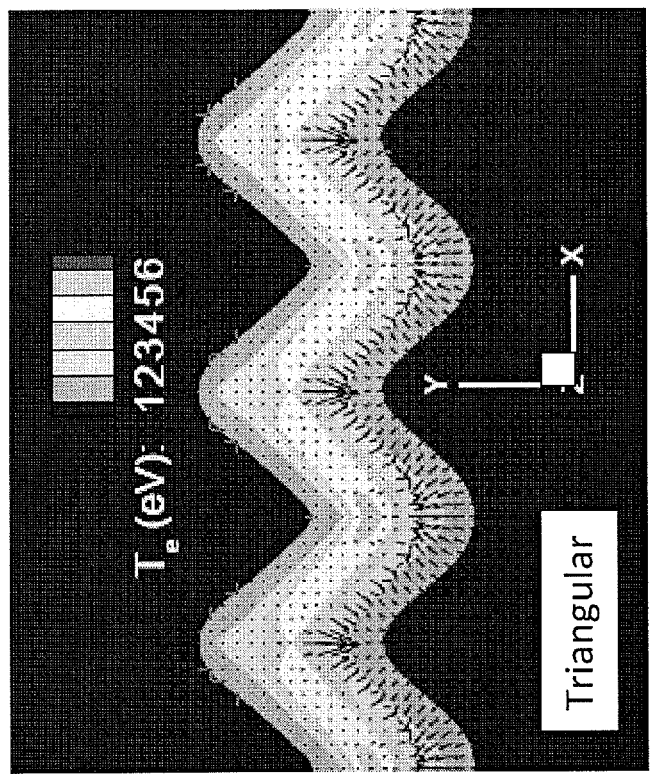
FIG. 19 shows electron temperature contours on the xy-plane for linear, triangular, serpentine, and square actuators in accordance with embodiments of the subject invention.
Figures 1, 19:
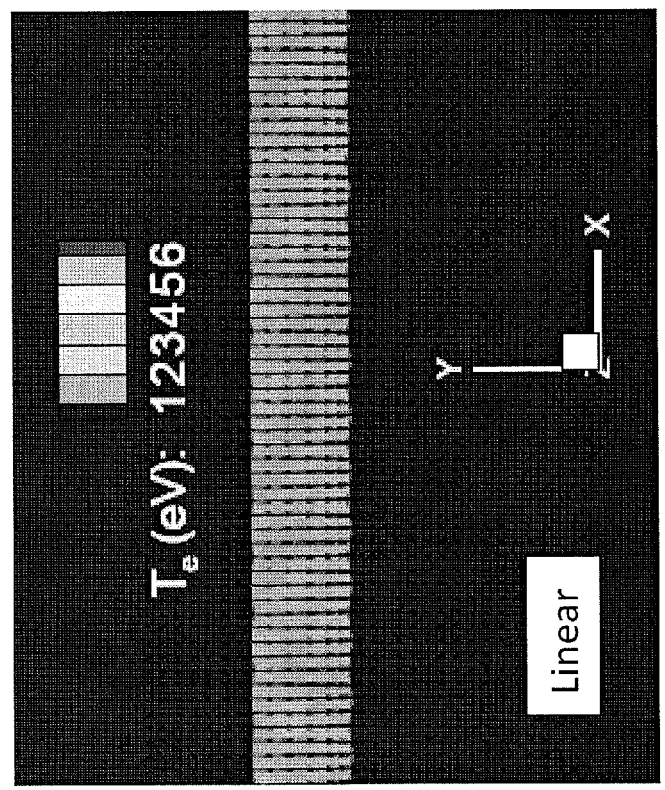
Figures 4, 19:
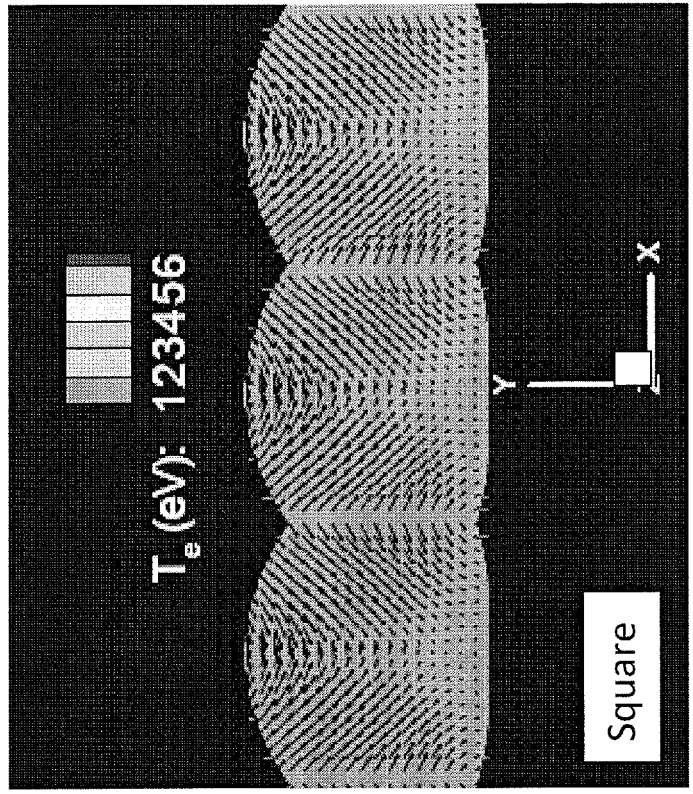
Figures 3, 19:
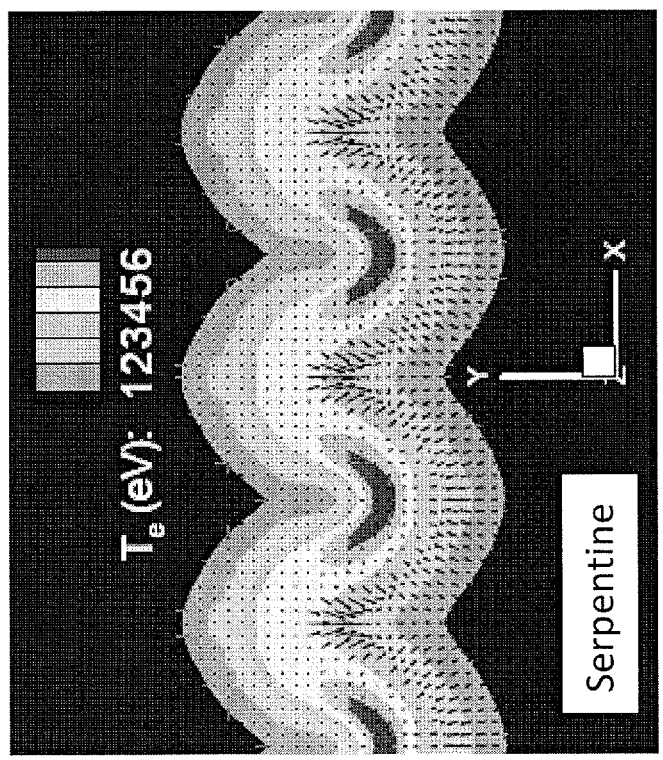

Four different actuator configurations (linear, square, triangular, and serpentine) can be simulated in quiescent air. A time averaged plasma force can be assumed as a body source term in the flow domain. The intensity of the plasma force is based on the electric field and charge separation. Referring to FIG. 19, one way to examine the variation of the plasma force distribution is to measure electron temperature. For a weakly ionized gas, the electron temperature (~eV) can be two orders of magnitude higher than the ions or neutral species. Basically, the electron temperature is proportional to the ratio E/N (electric field/neutral density). FIG. 19 shows the electron temperature distribution for four different plasma actuators. The results predict that the electron temperatures increase for triangular, serpentine, and square actuators due to the geometric effects.

Figures 1, 2, 20A:
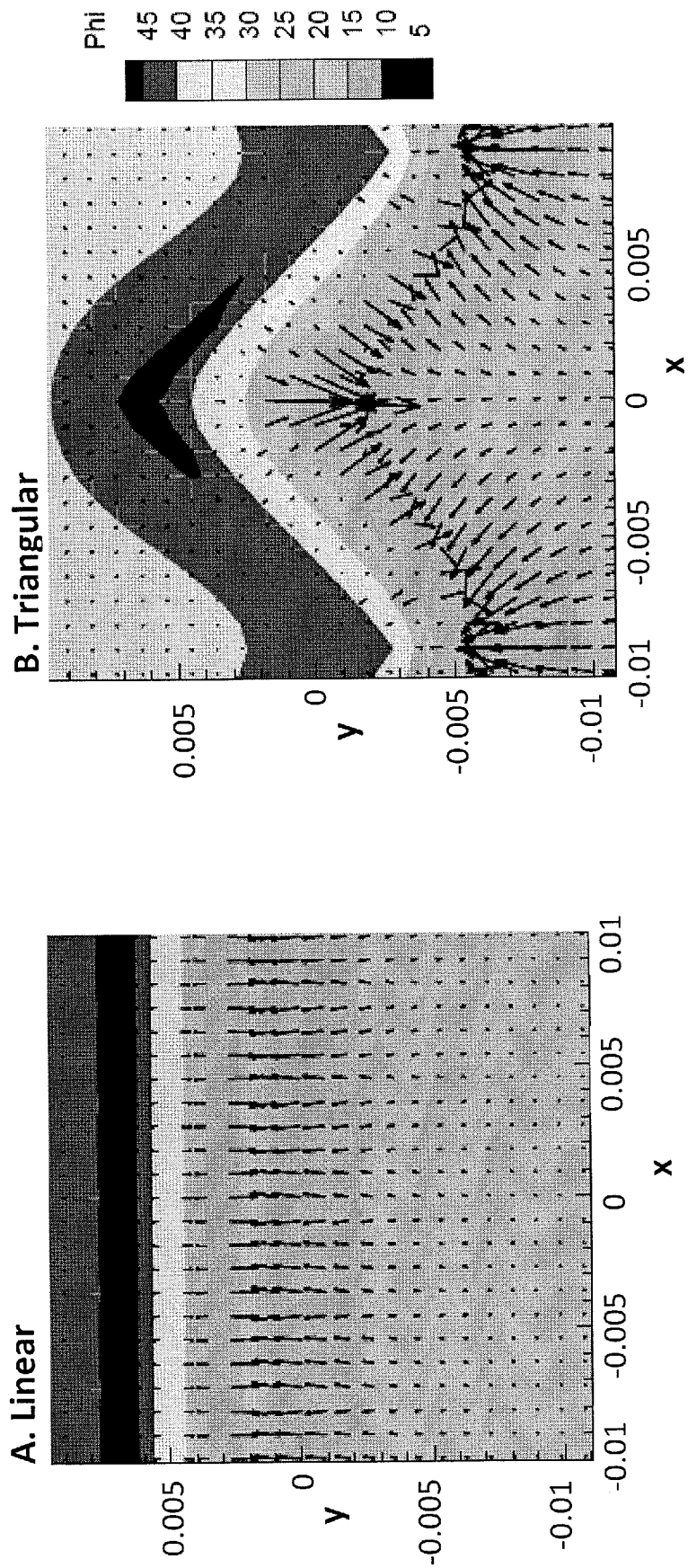
FIG. 20A show plasma force vectors overlaid on a potential contour (Phi) at xy-plane for four different designs in accordance with embodiments of the subject invention.
Figures 3, 4, 20A:
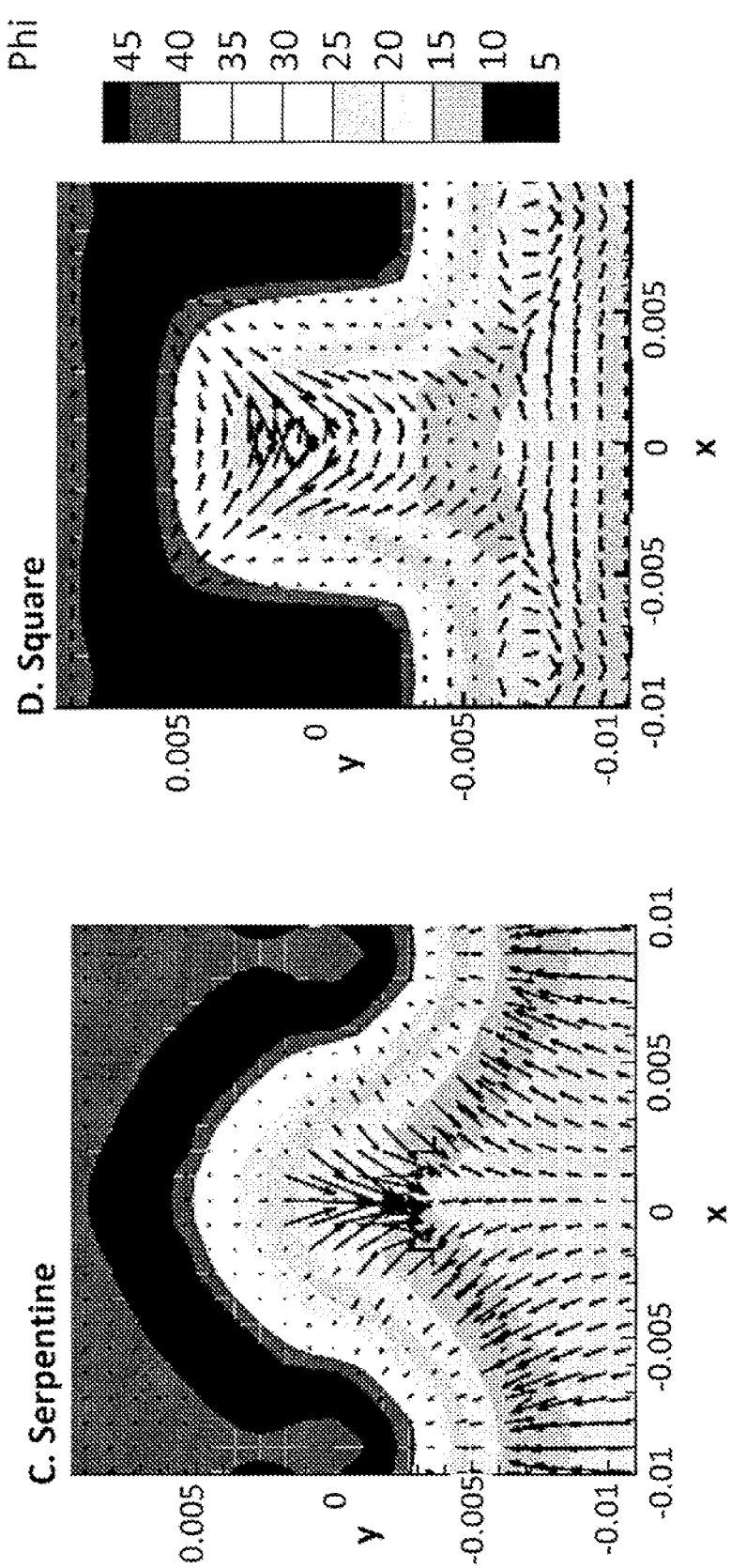
Figures 1, 2, 20B:
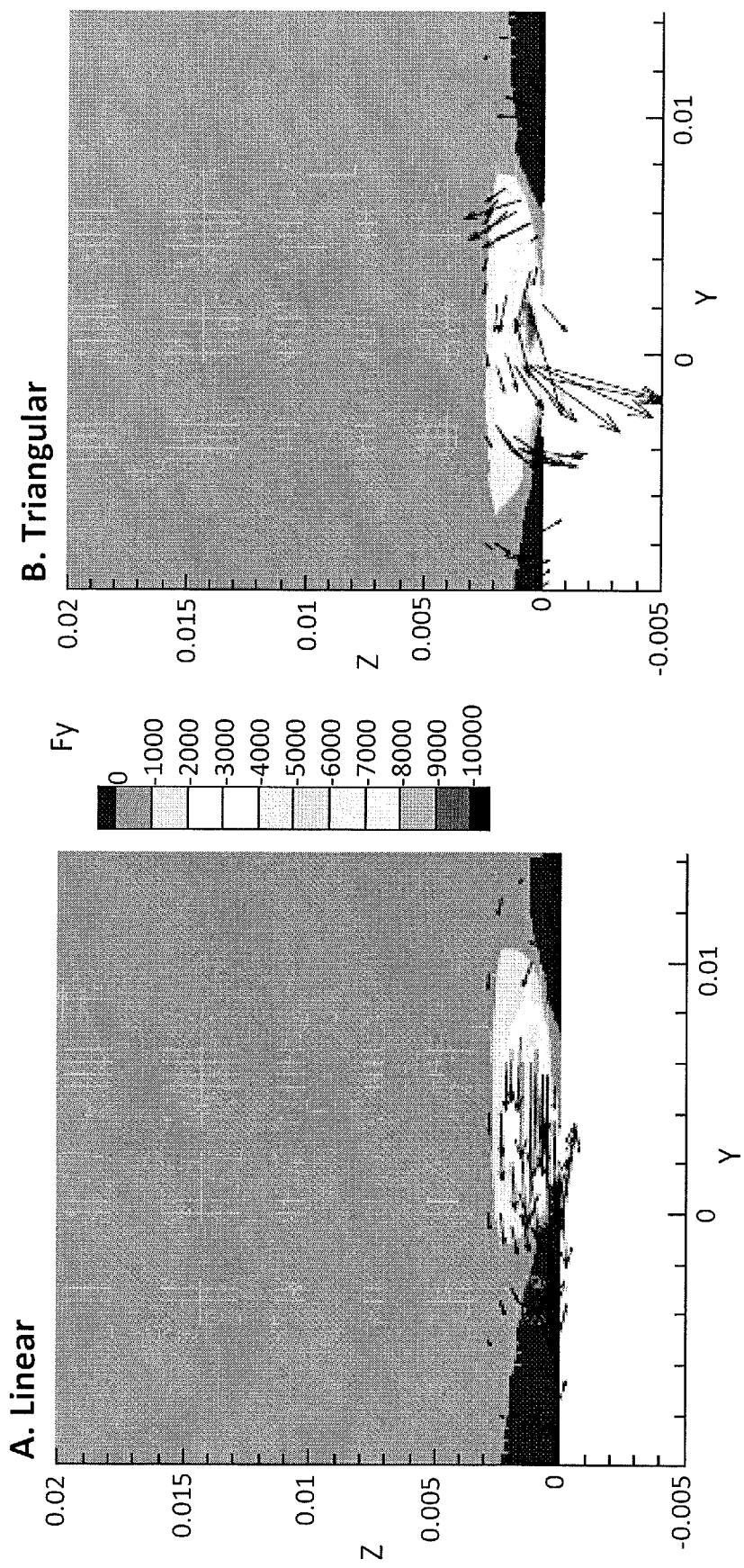
FIG. 20B shows plasma force vectors overlaid on a force contour (Fy) in y-direction at yz-plane for four different designs in accordance with embodiments of the subject invention.
Figures 3, 4, 20B:
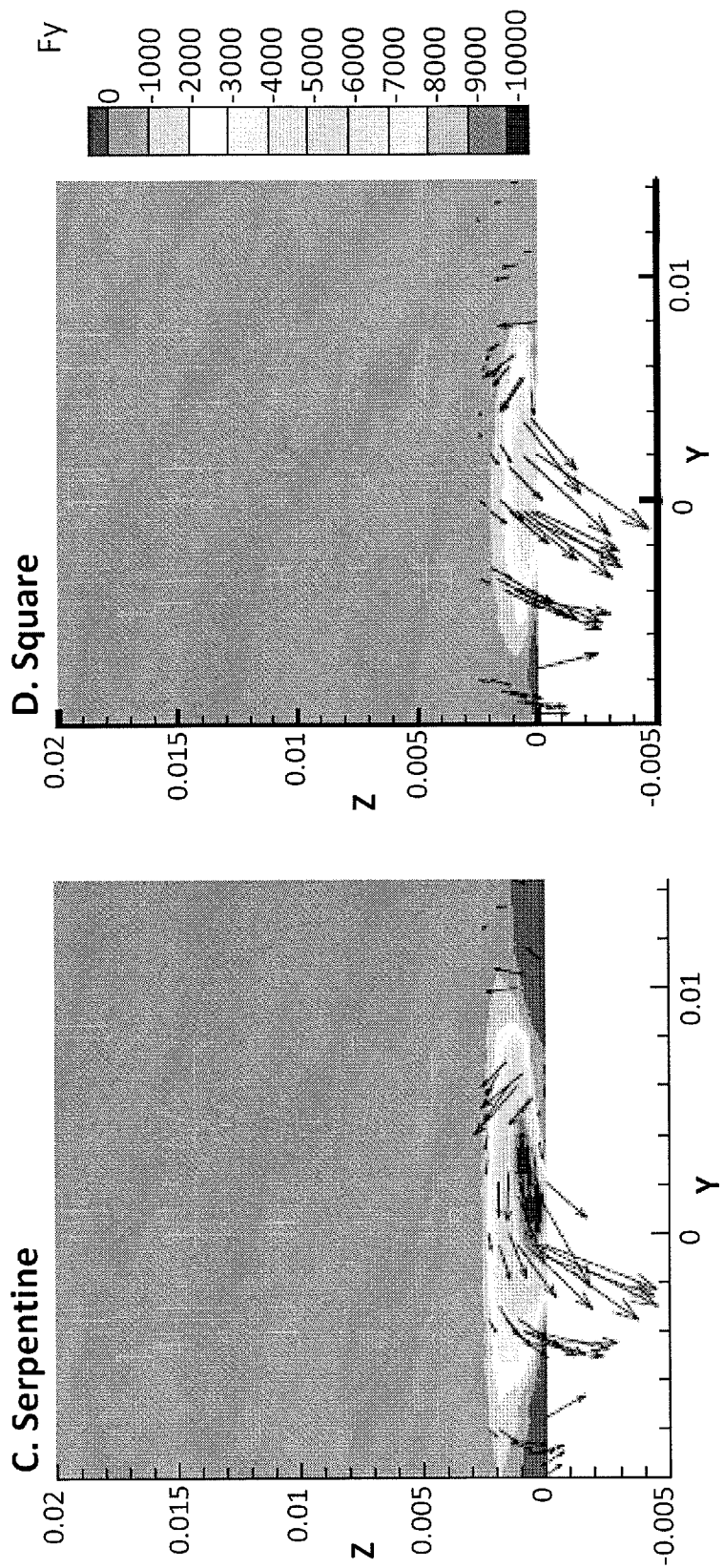

FIG. 20A shows force vectors overlaid on potential contours in the xy-plane (z=0) for linear, triangular, serpentine, and square actuators. The force vectors are acting from the powered electrode (red) to the grounded electrode (blue) for each shape. From the top view of the linear actuator, the force vectors are even and perpendicular to the electrodes. For the serpentine actuator, the force vectors follow the shape of a semi-circle electrode. Also, the electric force vectors for triangular and serpentine actuators are much larger than the linear case. This is a result of the concentrated electric fields as a result of the electrode geometry. Based on these results, it is clear that the shape of the electrode has a significant influence on the magnitude and distribution of the plasma body force. FIG. 20B shows electric force vectors overlaid on force ($F_y$) contours in the yz-plane (x=0) at center of the actuator. The force resulting from the linear configuration is predominately parallel to the surface, while the other actuators produce a force that follows more of a projectile profile which stems from the powered electrode to the grounded electrode. Referring again to FIGS. 20A and 20B, the force distributions are three-dimensional for the triangular, serpentine, and square designs.

Figures 1, 2, 21:
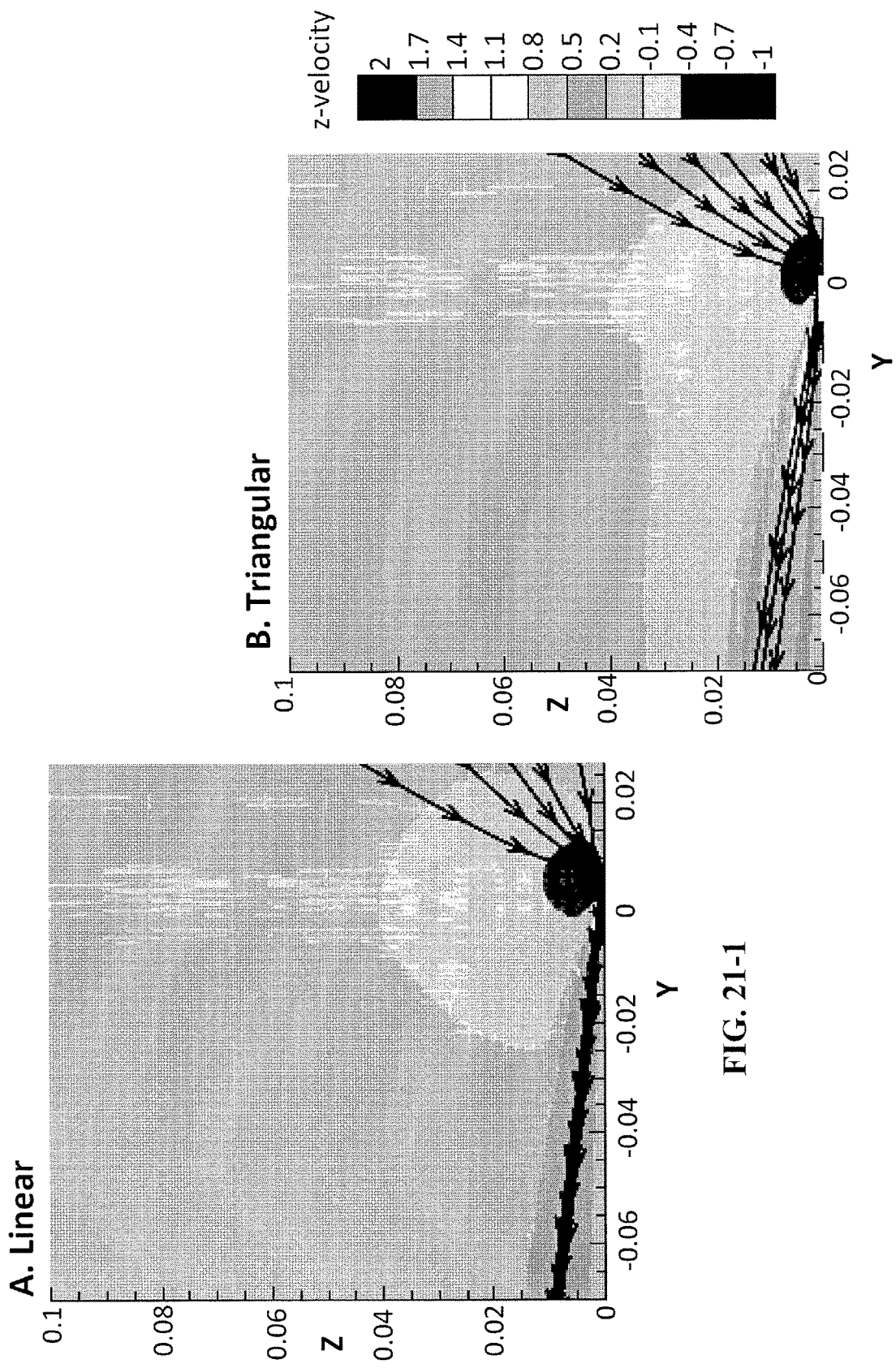
FIG. 21 shows streamtraces overlaid on vertical velocity contour (z-velocity) at yz-plane for four different designs in accordance with embodiments of the subject invention.
Figures 3, 4, 21:
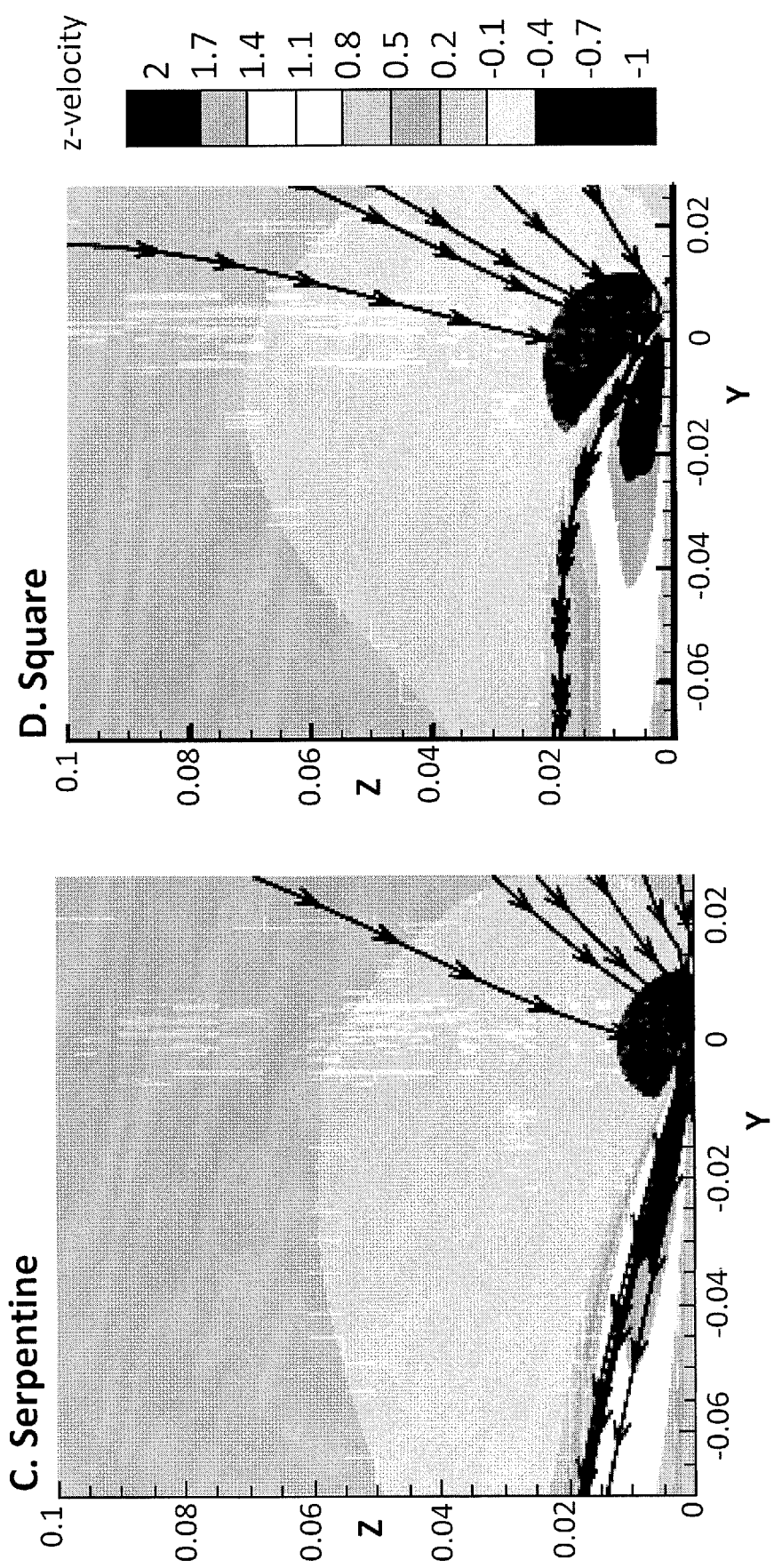

Referring to FIG. 21, the streamtraces overlaid on vertical velocity contours (z-velocity) for the yz-plane (x=0) arc shown. The flow is attracted from the inlet (right) and is pinched at center (y=0) of the domain, and then moves forward downstream of the actuators. The streamtraces also show that the flow is moving upward downstream after the pinching region. For the linear actuator, there is no pinching effect, so the plasma induced surface jet is issued in an approximate angle of 8 degrees. For the triangular actuator, there is a small pinching effect, with the resulting jet angle being approximately 12 degrees. This is only slightly higher than that of the linear actuator. For the serpentine and square designs, the pinching effects result in a large normal velocity away from the wall. Here, the numerically predicted jet issuing angle is approximately 23 and 33 degrees for the serpentine and square actuators, respectively. Based on jet angles of the plasma actuators, we can say that the serpentine and square actuators have much stronger three-dimensional (pinching) effects than the two-dimensional linear actuator.

Figures 2, 22:
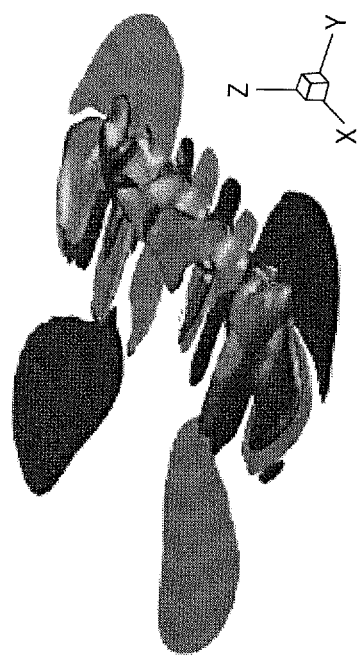
FIG. 22 shows three-dimensional dynamics of y-vorticities ($\pm 1000$ s$^{-1}$) at 16 ms for four different designs in accordance with embodiments of the subject invention.
Figures 1, 22:
Figures 3, 22:
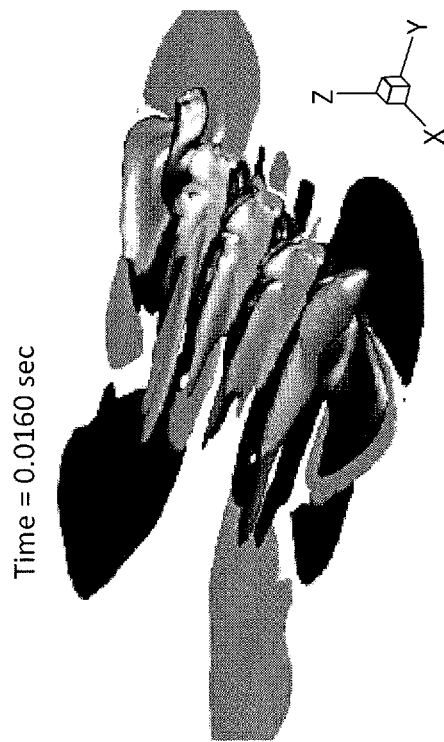
Figures 4, 22:
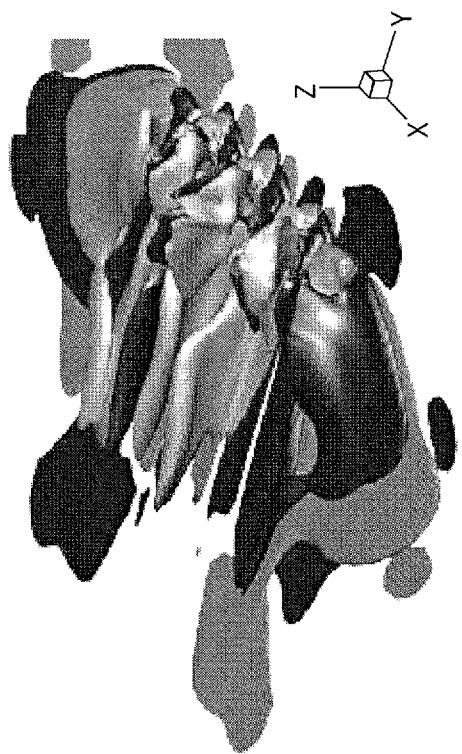
Figure 23:
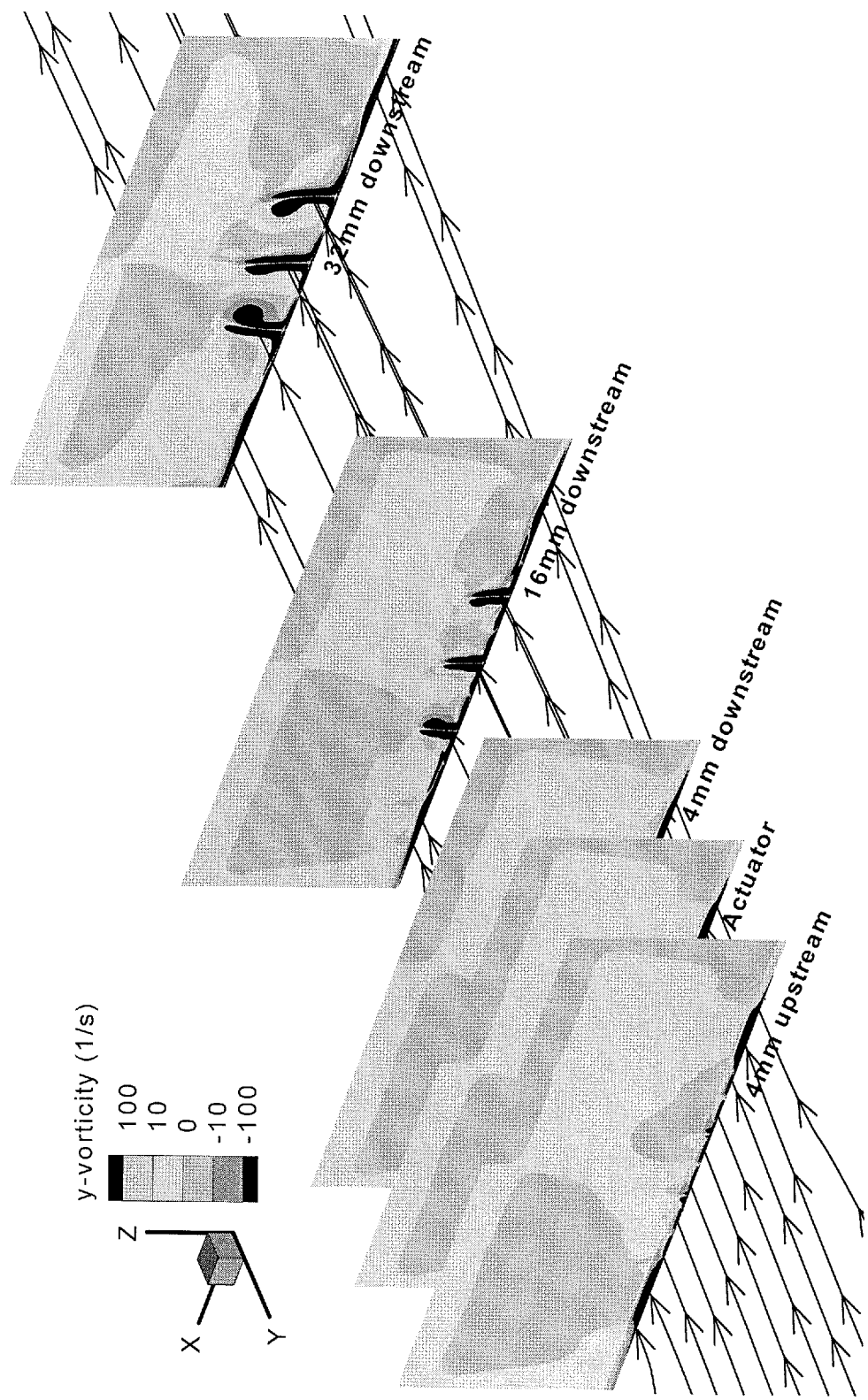
FIG. 23 shows velocity streamtraces and vorticity contours (y-vorticity) in streamwise direction at five different spanwise planes (xz-plane) for a square actuator in accordance with an embodiment of the subject invention.

FIG. 22 shows instantaneous three-dimensional vortical structures that are induced by the four different actuators after 16 milliseconds of operation. In FIG. 22, the iso-surfaces colored by red and blue depict y-vorticity ($\omega_y$, i.e. streamwise vorticity) levels at ±1000 sec$^{-1}$. For the two-dimensional linear actuator (baseline case), the flow is primarily in the streamwise (y) direction (with a small vertical (z) component). Thus the standard linear actuator produces very little streamwise (y) and normal (z) vorticity downstream of the actuator. For the three-dimensional (triangular, serpentine, and square) actuators, the fluid is pushed in all three directions, which increases vorticity generation. Specially, the streamwise y-vorticity dominates the flow field of the serpentine and square actuators. This represents the rapid changes in spanwise velocity which causes the pinching and spreading effects. The pinching effect changes the flow direction from surface normal to surface parallel while the spreading effect pushes the fluid outward and away from the actuator. When both effects act at same the time, they result in rapid rotational and translational motions of the fluid in all three directions. Notably, serpentine and square actuators are capable of inducing mixing much further downstream (in the y-direction) than the baseline two-dimensional linear actuator. The square actuator, in particular, generates strong vortical structures further downstream than the other designs. Such a design could be a very useful solid state device for increasing the local mixing of a surrounding fluid. A detailed look at the of vorticity generation resulting from a square actuator is presented in FIG. 23. FIG. 23 depicts counter-rotating vortex pairs which propagate downstream. In the pinching regions, the counter-rotating vortex pairs grow as they propagate downstream. On the contrary, the flow attaches on the flat surface in the spreading regions. Due to end effects, a stronger vorticity can be generated near the spanwise edges of the electrodes for all the actuators.

Figures 2, 24:
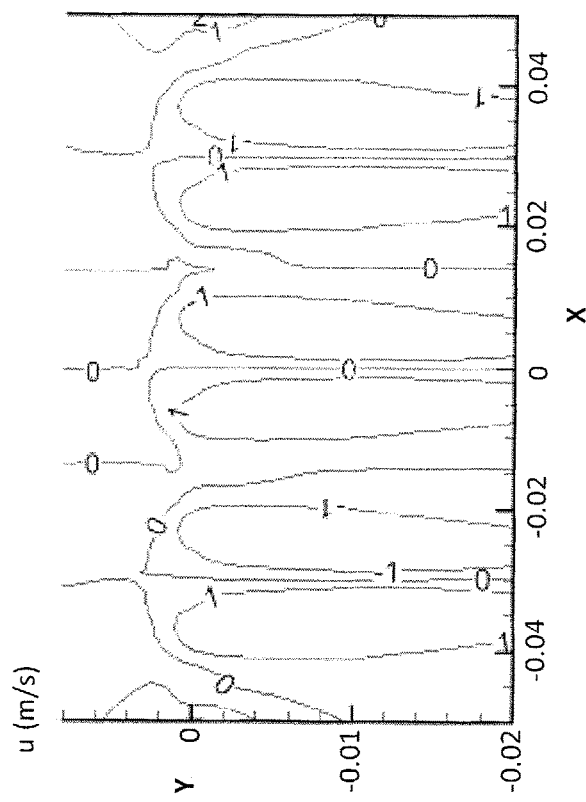
FIG. 24 shows plasma force vectors of serpentine actuator induced fluid flow in three-dimensions on xy-plane in accordance with an embodiment of the subject invention.
Figures 1, 24:
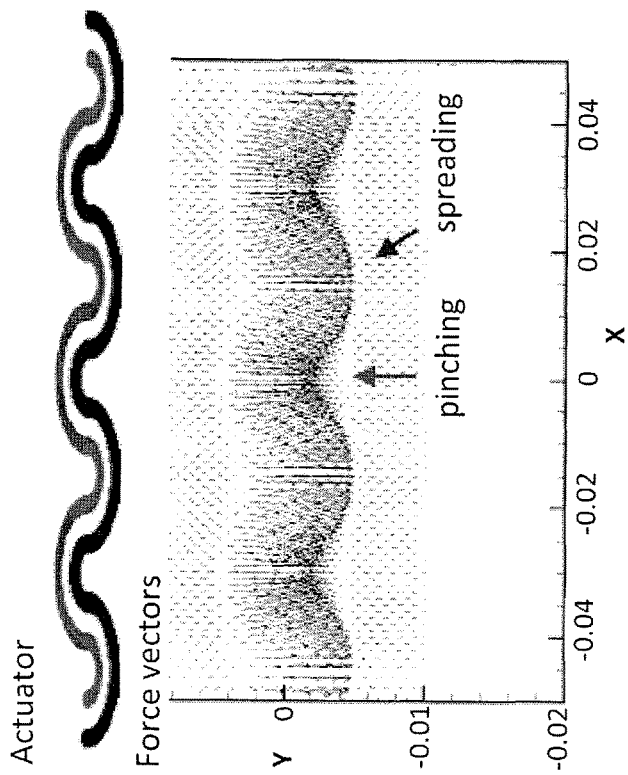
Figures 3, 24:
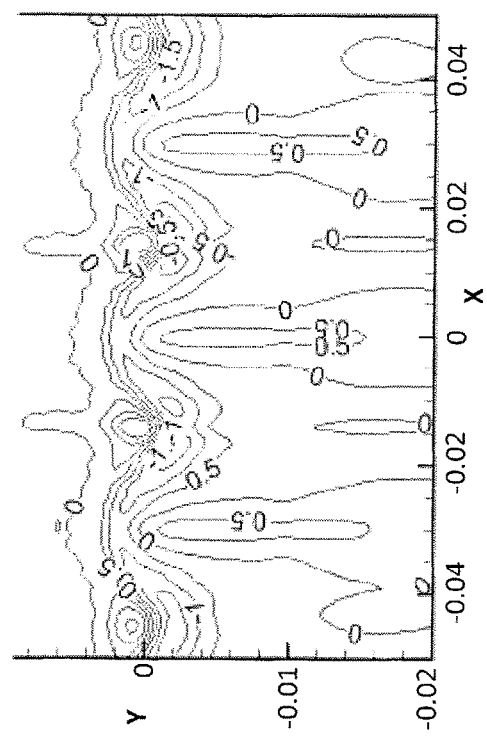
Figures 4, 24:
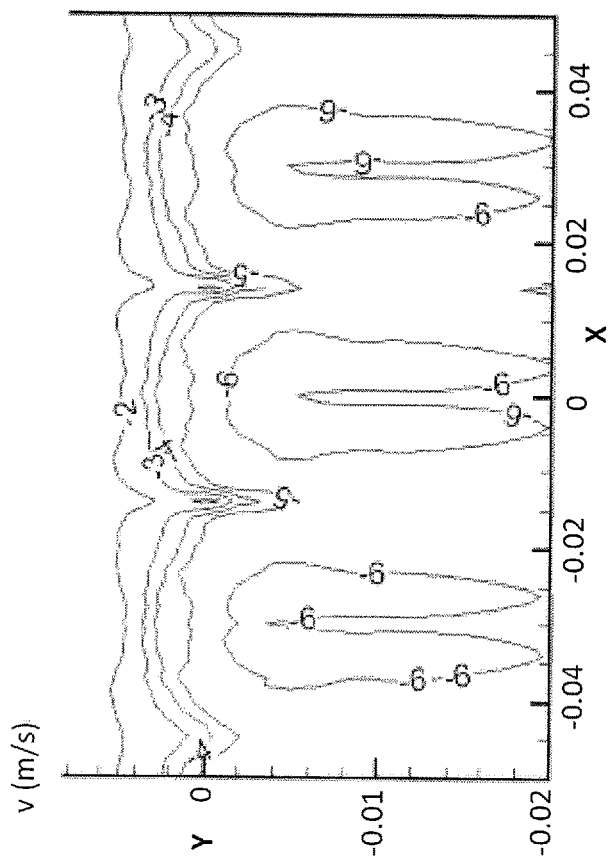
Figures 1, 25:
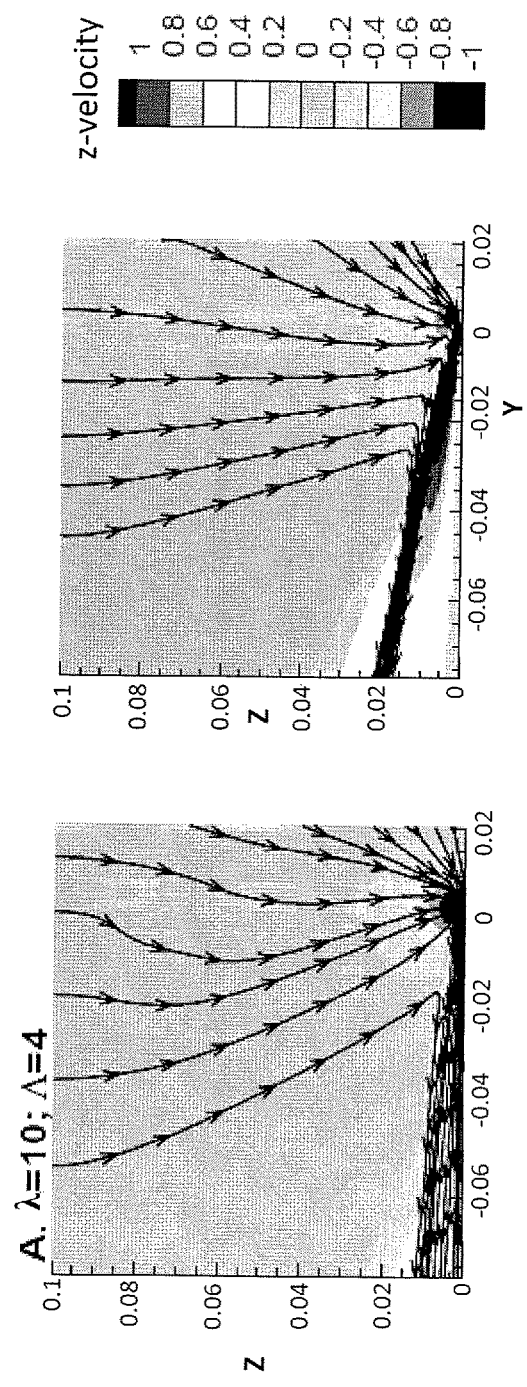
FIG. 25 shows z-velocity contour distribution with variables of wavelengths and amplitudes on yz-plane for serpentine and square actuators in accordance with embodiments of the subject invention.
Figures 2, 25:
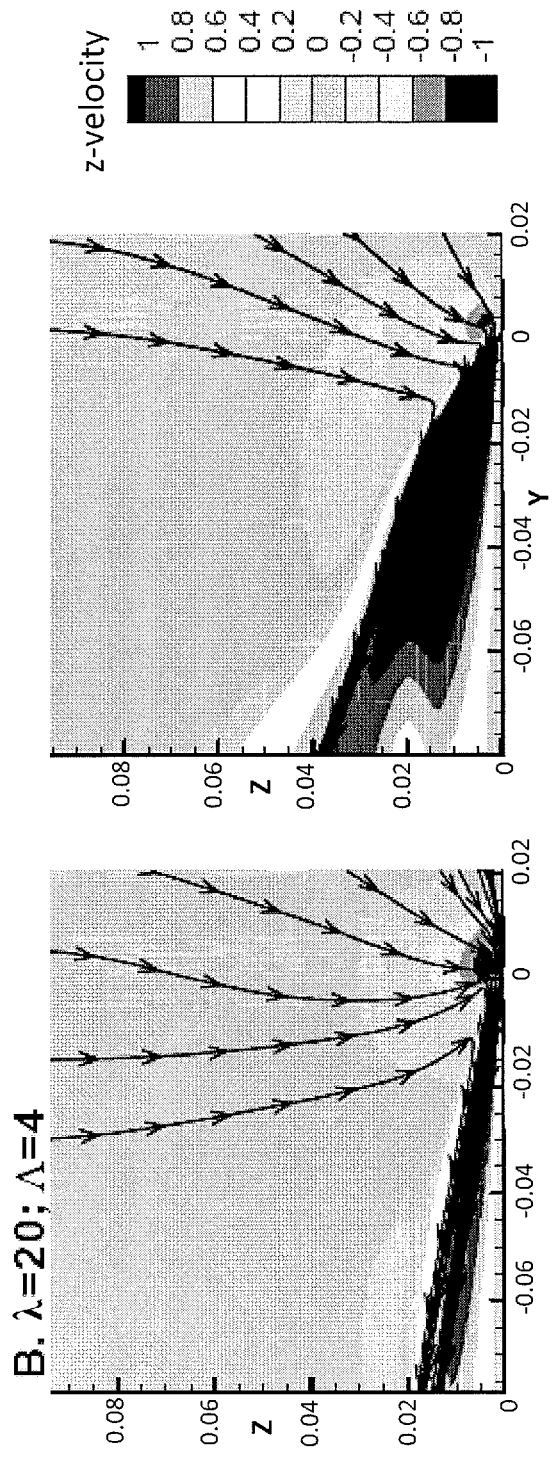
Figures 3, 25:
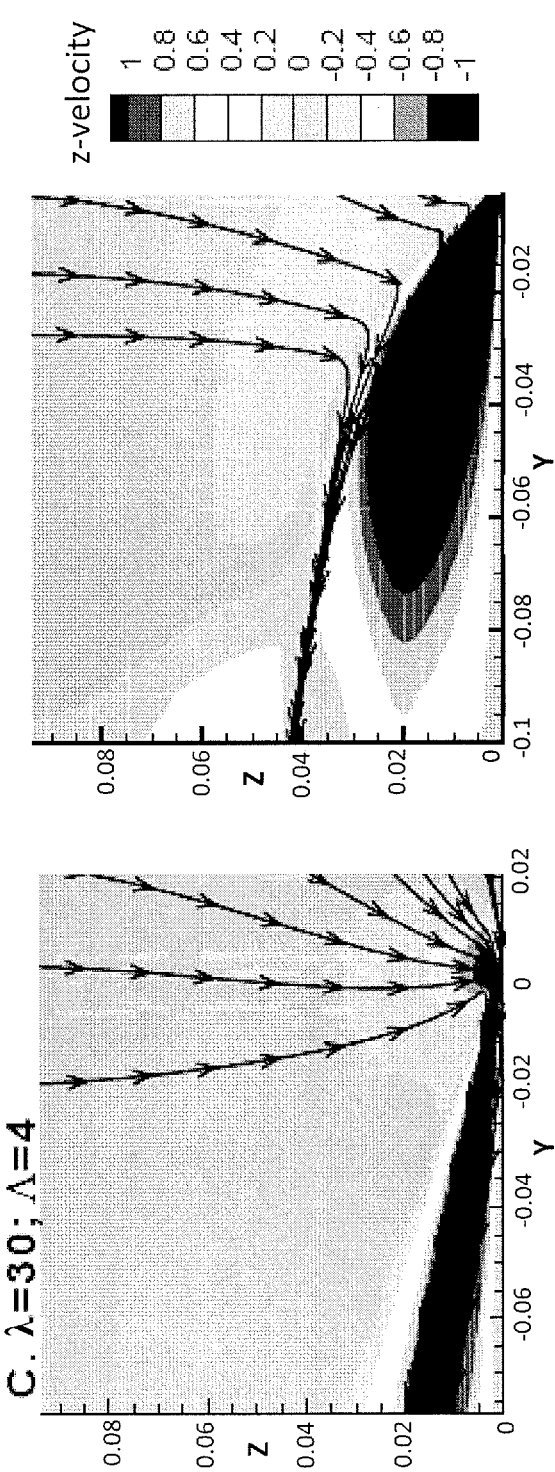
Figures 4, 25:
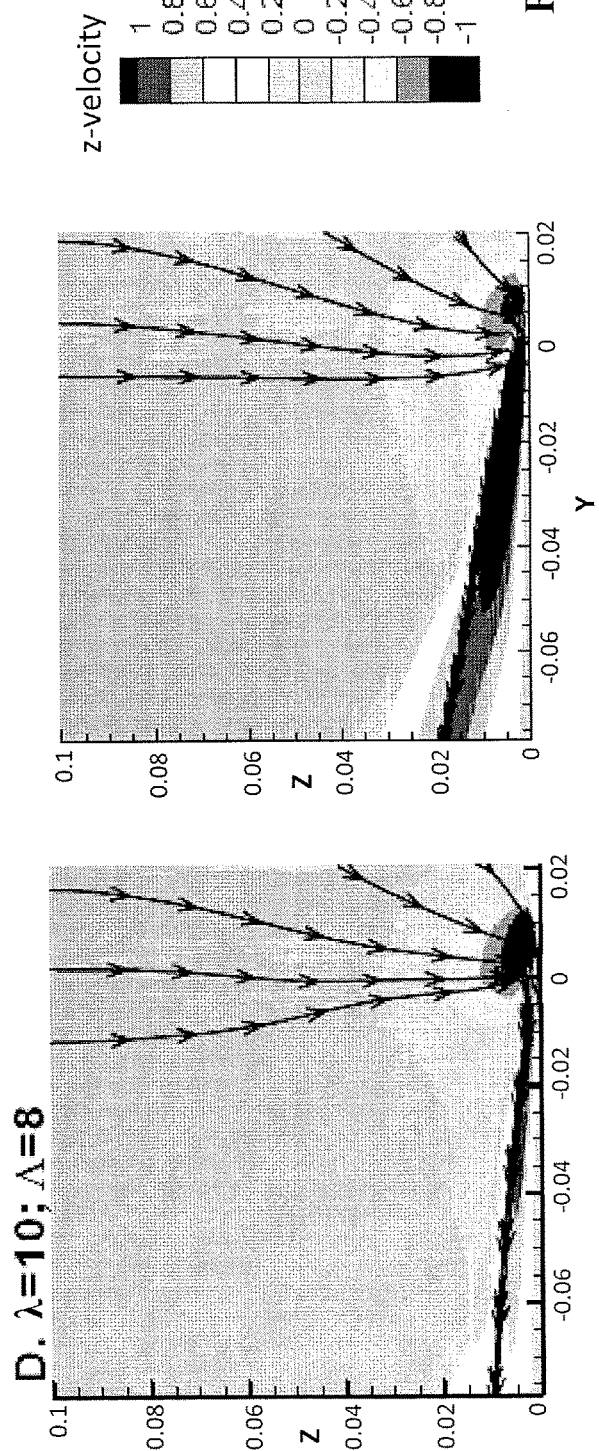
Figures 5, 25:
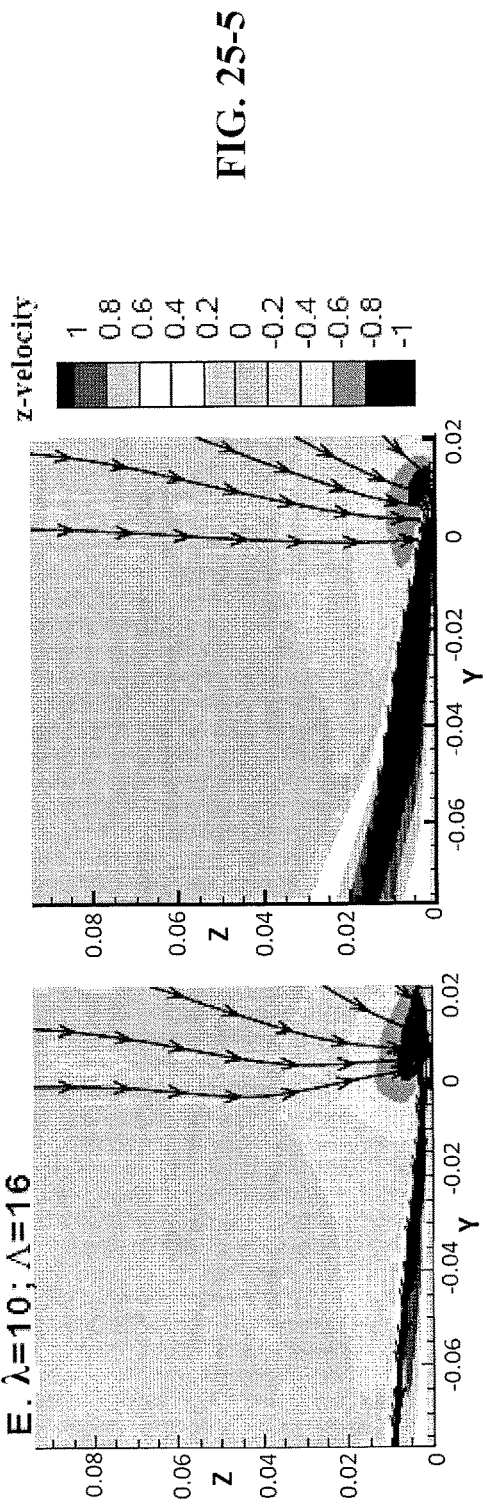

Serpentine and square actuators have a much stronger three-dimensional vortical effect on the flow than the other two designs. FIG. 24 (top) plots a serpentine design with a longer wavelength (30 mm), but shorter amplitude (4 mm). The force vectors follow the curved shape of the electrodes. Velocity contour lines of u, w, v are plotted on along the xy-plane (z=0.001 m). In the pinching regions, spanwise velocity (u) is varied from −1 to 1 m/s with symmetry. A vertical velocity (w) of 0.5 m/s and a streamwise velocity (v) of −6 m/s also exist in this region, which indicates that the flow is moving upward and forward. Five different cases for both serpentine (left column) and square actuator (right column) are shown in FIG. 25. FIG. 25 depicts streamtraces overlaid on the vertical velocity contour (z-velocity) cut along the yz-plane. The influence of different wavelengths ($\lambda$=10, 20, 30 mm) or amplitudes ($\Lambda$=4, 8, 16 mm) is presented. It is obvious to see that the vertical velocity of the flow increases as the wavelengths increases from $\lambda$=10 to $\lambda$=20 mm for both designs. On the contrary, for a fixed wavelength (10 mm) varying the amplitude has little effect of the resultant vertical velocity for either design. The large increase in vertical velocity for the square configuration as compared to the serpentine actuator is attributed to the larger ionized area/region produced by the square design (FIG. 3). From the streamtraces in FIG. 25, the near wall jet angle changes significantly as the actuators wavelength increases. In particular the jet angle increases almost 100% as the wavelength of the square actuator increases from 10 mm to 20 mm However, the jet angle does not increase linearly with a further increase in wavelength. As the jet angle increases the vertical component of the flow velocity increases. In other words, the decreasing jet angle means the streamwise velocity becomes dominant. Based on these results, different flow physics may be triggered by manipulation of the actuators wavelength and amplitude. Depending on the particular application of the plasma actuator, different effects may be more beneficial than others.

EXAMPLE 1

A photo-fabrication method can be used to construct the continuously curved electrode shape of the serpentine actuator. Copper tape can be adhered to both sides of a 3 mm thick acrylic plate. A negative photo-resist, a transparent film, and a UV light can then be employed to imprint the specific serpentine design on the copper which can then be selectively removed after being submerged in a bath of ferric chloride. The width of the exposed and grounded electrode can be, e.g., 2 mm, and a uniform horizontal gap of, e.g., 2 mm can be kept. The serpentine actuator can be constructed from patterned circular arcs. The wavelength ($\lambda$) of this design is 20 mm and the amplitude ($\Lambda$) is 8 mm. To inhibit end effects from influencing the velocity measurements, the tested actuators consisted of 4.5 periods for an overall crosswise length of 90 mm.

The non-intrusive optical diagnostic technique of particle image velocimetry (PIV) is used to visualize and measure the induced flow field. The actuator is set up in a 61 cm×61 cm×120 cm quiescent chamber which is seeded with vaporized Ondina oil. A light sheet cutting along the span of the actuator was generated using a Nd:YAG, dual cavity pulsed, 532 nm laser (New Wave Research Solo PIV II 30). A La Vision's Imager Intense (1376×1040 pixels) camera was used to capture the PIV images. The field of view for each image was approximately 40 mm×30 mm. The floor of the chamber is connected to a translational traverse (Velmex A1503P40-S1.5) allowing it to move ±19 mm off center.

This allows the measurement plane along the span of the actuator to be easily selected without having to readjust the light sheet each time.

Figures 1, 2, 26:
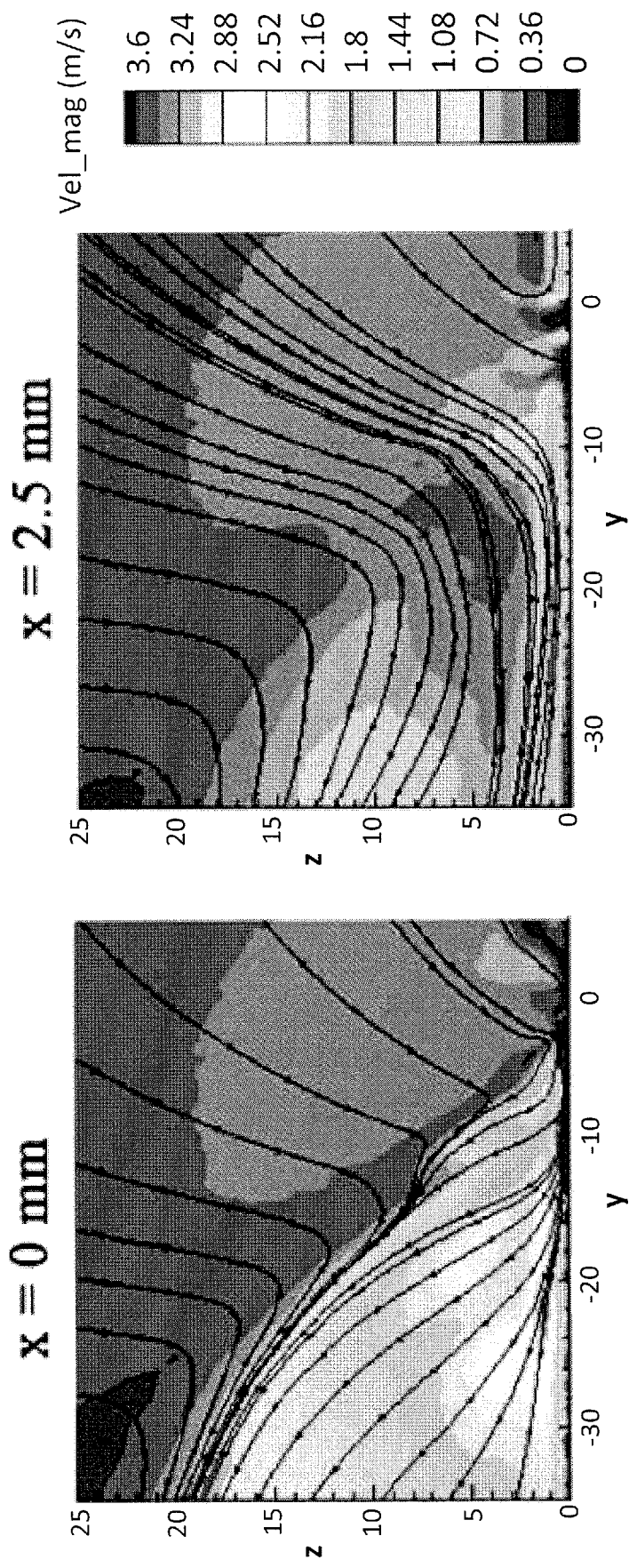
FIG. 26 shows velocity magnitude of the time-averaged vector field overlaid with streamtraces for five vertical planes (yz-plane) along the span of a serpentine actuator (18.5 kVpp input) in accordance with an embodiment of the subject invention.
Figures 4, 26:
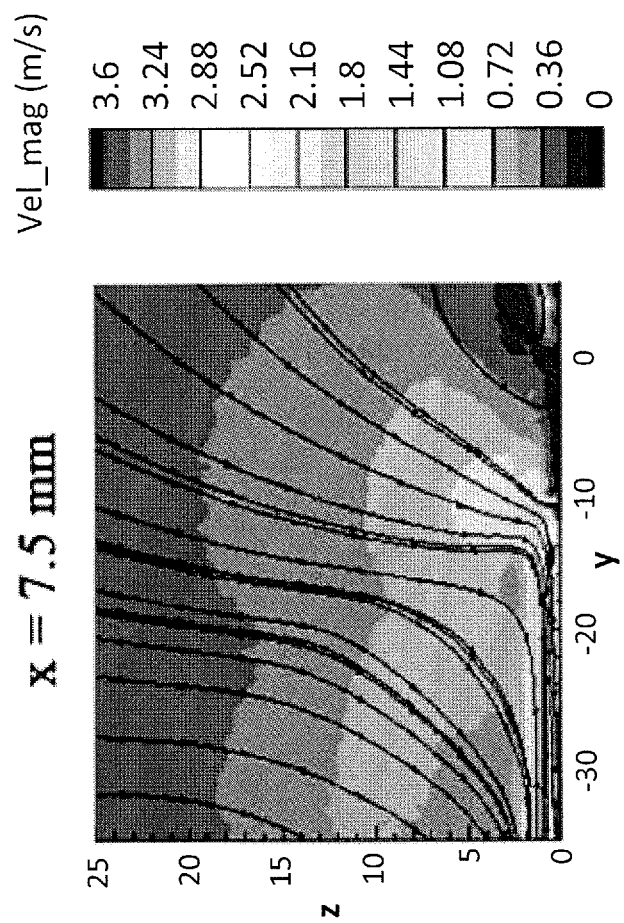
Figures 3, 26:
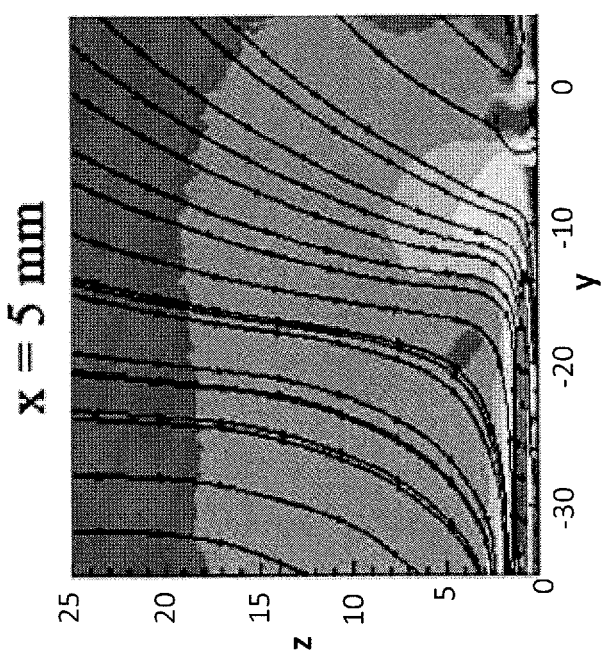
Figures 5, 26:
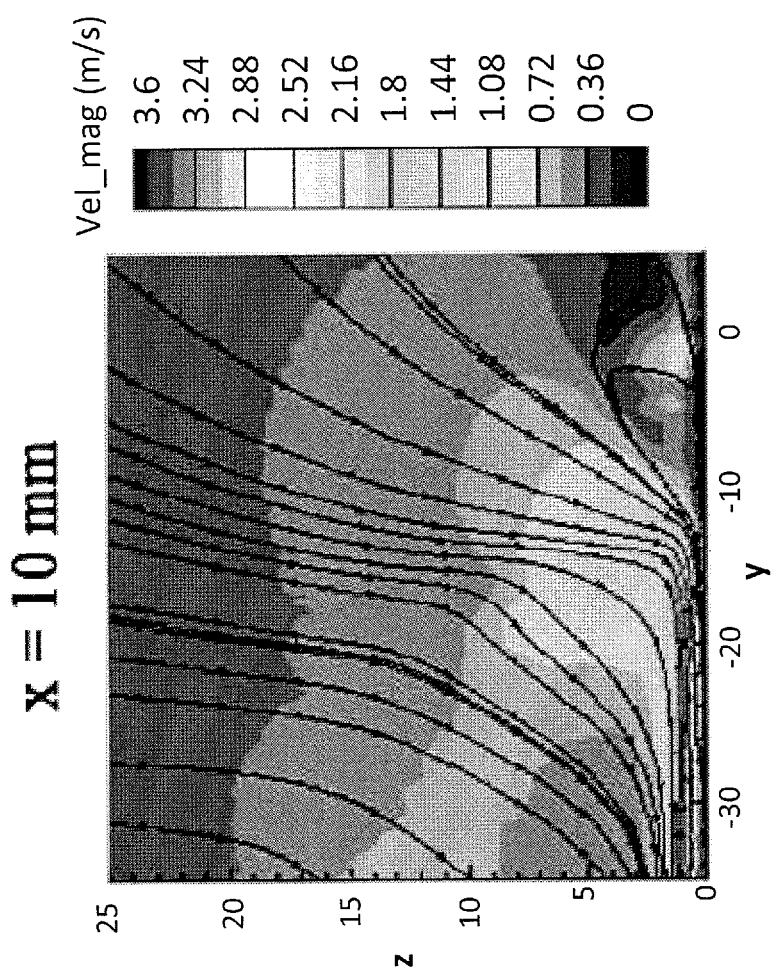
Figure 27:
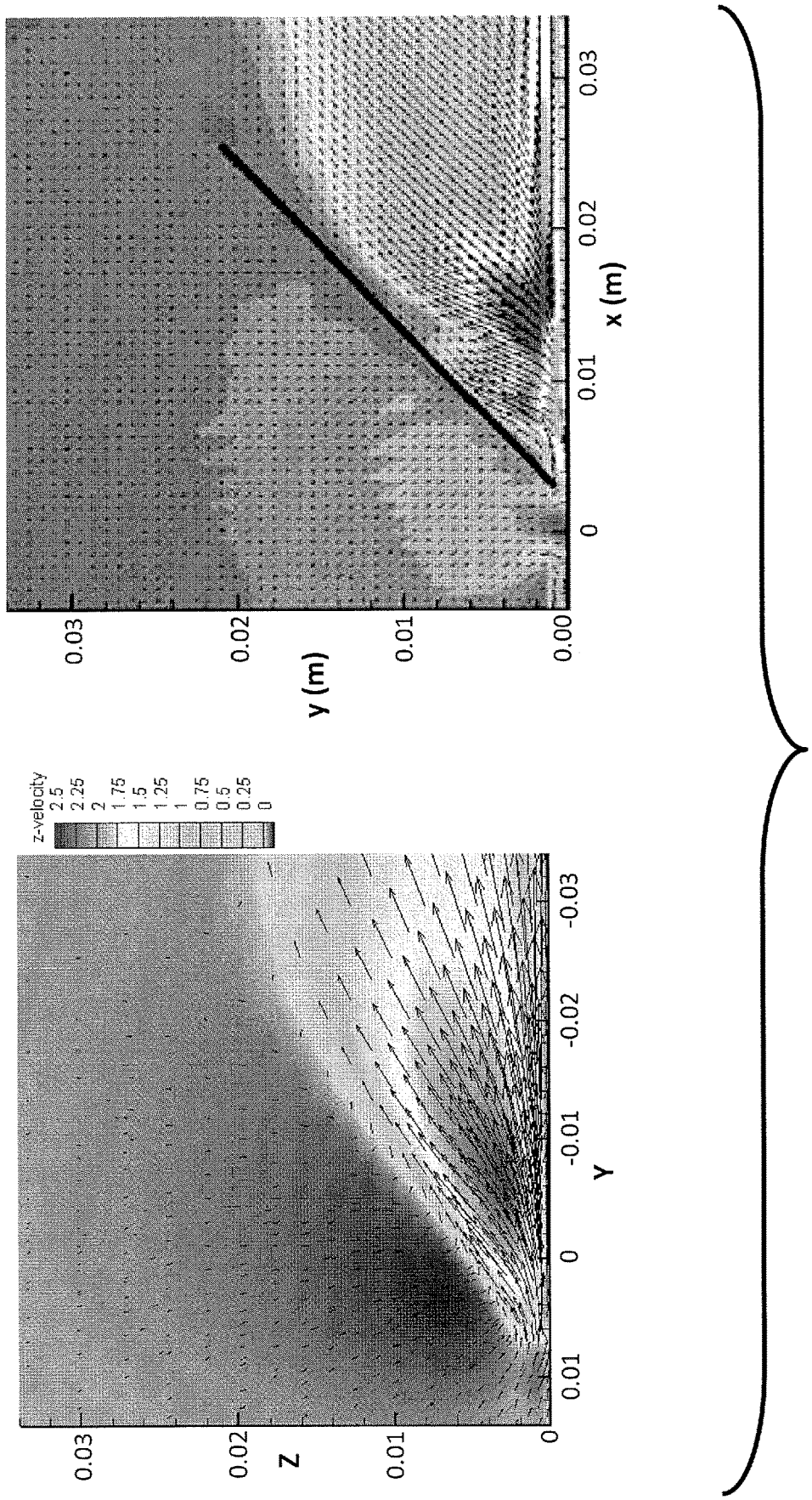
FIG. 27 shows vertical velocity contour validation with experimental data for a square actuator in accordance with an embodiment of the subject invention.

The induced flow field was measured along the span of the actuator with a planar PIV system as described above. The measurements elucidate the complicated flow physics induced by the serpentine actuator. FIG. 26 depicts the velocity magnitude of the time averaged vector field overlaid with streamtraces for five different vertical planes (x=0, 2.5, 5.0, 7.5, 10.0 mm), along the span of the actuator. The pinching and spreading effects are clearly visible at the trough (x=0) and crest (x=10 mm) locations, respectively. Specifically at the trough the directed jet shows a maximum inducement angle of ~35 degrees. FIG. 27 represents the vertical velocity contours for a serpentine actuator that closely validates the numerical prediction with experimental data.

Figure 28:
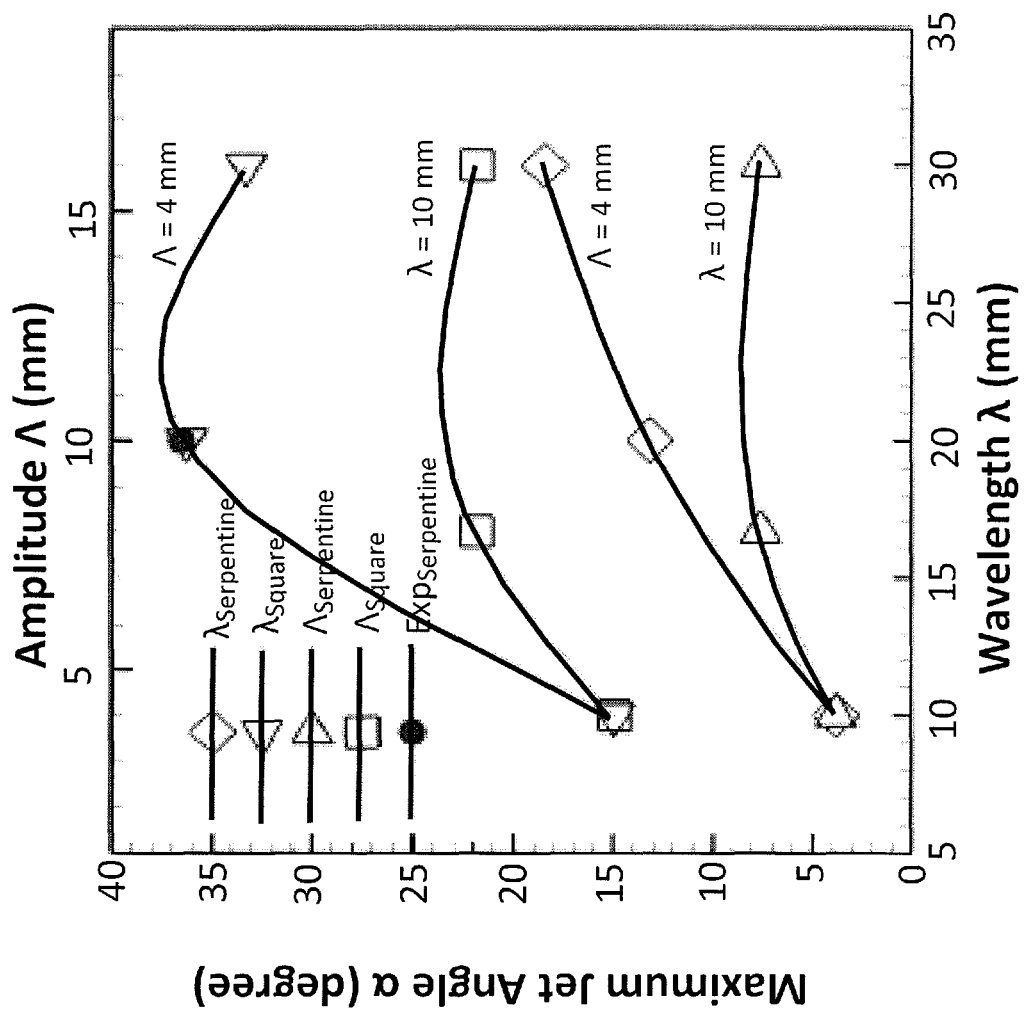
FIG. 28 shows a comparison of numerical and experimental results for jet angles induced by serpentine and square actuators with different wavelengths and amplitudes in accordance with embodiments of the subject invention.

FIG. 28 shows the results of the jet angles for serpentine and square actuators with different wavelengths and amplitudes. For cases of the fixed wavelength of 10 mm, the serpentine and square actuators show similar tendency as the amplitudes increase. The jet angle of the square actuator is around three times higher than serpentine actuator. On the other hand, for the cases in which the amplitude is fixed (4 mm) and the wavelength is increased the jet angle increases for both configurations. In simulation, we numerically predict the highest jet angle is ~36 degrees for the square actuator with wavelength of 20 mm and amplitude of 4 mm. Experimentally a jet angle of ~35 degrees was observed for a serpentine actuator ($\lambda$=20 mm and $\Lambda$=8 mm). The relative agreement between the numerical and experimental findings provides some confidence that the numerical model is capable of predicting reasonable flow characteristics resulting from DBD actuation.

Aspects of the invention may be described in the general context of computer-executable instructions, such as program modules, being executed by a computer. Generally, program modules include routines, programs, objects, components, data structures, etc., that perform particular tasks or implement particular abstract data types. Such program modules can be implemented with hardware components, software components, or a combination thereof. Moreover, those skilled in the art will appreciate that the invention can be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention can be practiced without these specific details. Computer systems, servers, work stations, and other machines can be connected to one another across a communication medium including, for example, a network or networks.

As one skilled in the art will appreciate, embodiments of the present invention can be embodied as, among other things: a method, system, or computer-program product. Accordingly, the embodiments can take the form of a hardware embodiment, a software embodiment, or an embodiment combining software and hardware. In an embodiment, the present invention takes the form of a computer-program product that includes computer-useable instructions embodied on one or more computer-readable media Methods, data structures, interfaces, and other aspects of the invention described above can be embodied in such a computer-program product.

Computer-readable media include both volatile and non-volatile media, removable and nonremovable media, and contemplate media readable by a database, a switch, and various other network devices. By way of example, and not limitation, computer-readable media incorporate media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, non-transitory media are used.

The invention can be practiced in distributed-computing environments where tasks are performed by remote-processing devices that are linked through a communications network or other communication medium. In a distributed-computing environment, program modules can be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention can be practiced in a network environment such as a communications network. Such networks are widely used to connect various types of network elements, such as routers, servers, gateways, and so forth. Further, the invention can be practiced in a multi-network environment having various, connected public and/or private networks.

Communication between network elements can be wireless or wireline (wired). As will be appreciated by those skilled in the art, communication networks can take several different forms and can use several different communication protocols.

Embodiments of the subject invention can be embodied in a processing system. Components of the processing system can be housed on a single computer or distributed across a network as is known in the art. In an embodiment, components of the processing system are distributed on computer-readable media. In an embodiment, a user can access the processing system via a client device. In an embodiment, some of the functions or the processing system can be stored and/or executed on such a device. Such devices can take any of a variety of forms. By way of example, a client device may be a desktop or laptop computer, a personal digital assistant (PDA), an MP3 player, a communication device such as a telephone, pager, email reader, or text messaging device, or any combination of these or other devices. In an embodiment, a client device can connect to the processing system via a network. As discussed above, the client device may communicate with the network using various access technologies, both wireless and wireline. Moreover, the client device may include one or more input and output interfaces that support user access to the processing system. Such user interfaces can further include various input and output devices which facilitate entry of information by the user or presentation of information to the user. Such input and output devices can include, but are not limited to, a mouse, touch-pad, touch-screen, or other pointing device, a keyboard, a camera, a monitor, a microphone, a speaker, a printer, a scanner, among other such devices. As further discussed above, the client devices can support various styles and types of client applications.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

Numbered Embodiments

1. A device for mixing combustion materials, comprising:
   a chamber comprising an inlet;
   a pair of electrodes positioned on or proximate an inner surface of the chamber, wherein at least one electrode of the pair of electrodes has one or more turns formed therein; and
   a power supply configured to apply a voltage potential across the pair of electrodes.
2. The device according to embodiment 1, wherein at least a portion of the chamber has a tubular cross-section, wherein the pair of electrodes is provided around an entire perimeter of the inner surface of the at least a portion of the chamber.
3. The device according to embodiment 2, wherein the pair of electrodes is provided around at least 90% of the perimeter of the inner surface of the at least a portion of the chamber.
4. The device according to embodiment 2, wherein the pair of electrodes is provided around at least 80% of the perimeter of the inner surface of the at least a portion of the chamber.
5. The device according to embodiment 2, wherein the pair of electrodes is provided around at least 50% of the perimeter of the inner surface of the at least a portion of the chamber.
6. The device according to embodiment 1, wherein the at least one electrode of the pair of electrodes has a plurality of turns formed therein.
7. The device according to embodiment 1, wherein each electrode of the pair of electrodes has one or more turns formed therein.
8. The device according to embodiment 1, wherein each electrode of the pair of electrodes has a plurality of turns formed therein.
9. The device according to embodiment 1, wherein each electrode of the pair of electrodes has a serpentine shape comprising at least two periods.
10. The device according to embodiment 8,
    wherein the pair of electrodes comprises a first electrode and a second electrode;
    wherein the first electrode has a first plurality of turns;
    wherein the second electrode has a second plurality of turns;
    wherein the first plurality of turns formed in the first electrode correspond to the second plurality of turns formed in the second electrode; and
    wherein each turn of the first plurality of turns formed in the first electrode is positioned on the first electrode in the same order as the corresponding turn of the second plurality of turns formed in the second electrode.
11. The device according to embodiment 10, wherein each turn of the first plurality of turns formed in the first electrode is made at a corresponding approximately same angle as the corresponding turn of the second plurality of turns formed in the second electrode.
12. The device according to embodiment 1,
    wherein the pair of electrodes comprises a first electrode and a second electrode;
    wherein the first electrode has a first length;
    wherein the second electrode has a second length; and
    wherein a distance between the first electrode and the second electrode is approximately constant as a function of the first length and the second length.
13. The device according to embodiment 1,
    wherein the pair of electrodes comprises a first electrode and a second electrode; and
    wherein a distance between the first electrode and the second electrode varies as a function of the first length and the second length.
14. The device according to embodiment 1, wherein the device is adapted to receive a fluid via the inlet; wherein at least a portion of the fluid received via the inlet is proximate the pair of electrodes; wherein the pair of electrodes are configured such that when the voltage potential is applied across the pair of electrodes when at least a portion of the fluid is proximate the pair of electrodes a plasma discharge is produced in the fluid; and wherein when the plasma discharge is produced in the fluid one or more three-dimensional flow structures are generated in the fluid that induce mixing of the fluid.
15. The device according to embodiment 14, wherein at least one of the one or more three-dimensional flow structures comprises a vortical flow structure.
16. The device according to embodiment 14, wherein at least one of the one or more three-dimensional flow structures comprises a counter-rotating vortex pair.
17. The device according to embodiment 14, wherein a first three-dimensional flow structures is at an angle with a second three-dimensional flow structure.
18. A method of mixing a fluid, comprising:
    providing a pair of electrodes, wherein at least one electrode of the pair of electrodes has one or more turns formed therein;
    flowing a fluid in a fluid flow direction across the pair of electrodes; and
    applying a voltage potential across the pair of electrodes, such that a plasma discharge is produced in the fluid, wherein when the plasma discharge is produced turbulence is generated in the fluid that mixes the fluid by pushing a first portion of the fluid in a first direction and a second portion of the fluid in a second direction, wherein the first direction and the second direction are non-parallel.
19. The method according to embodiment 18,
    wherein when the plasma discharge is produced the turbulence generated in the fluid mixes the fluid by pushing a third portion of the fluid in a third direction;
    wherein the first direction is not parallel to the fluid flow direction;
    wherein the second direction is not parallel to the fluid flow direction and not parallel to the first direction; and
    wherein the third direction is parallel to the fluid flow direction.

20. The method according to embodiment 18, wherein each electrode of the pair of electrodes has a plurality of turns formed therein.

21. The method according to embodiment 20,
wherein the pair of electrodes comprises a first electrode and a second electrode;
wherein the first electrode has a first plurality of turns;
wherein the second electrode has a second plurality of turns;
wherein the first plurality of turns formed in the first electrode correspond to the second plurality of turns formed in the second electrode; and
wherein each turn of the first plurality of turns formed in the first electrode is positioned on the first electrode in the same order as the corresponding turn of the second plurality of turns formed in the second electrode.

22. The method according to embodiment 18, wherein each electrode of the pair of electrodes has a serpentine shape comprising at least two periods.

23. The method according to embodiment 18,
wherein the pair of electrodes comprises a first electrode and a second electrode;
wherein the first electrode has a first length;
wherein the second electrode has a second length; and
wherein a distance between the first electrode and the second electrode is approximately constant as a function of the first length and the second length.

24. The method according to embodiment 18,
wherein the pair of electrodes comprises a first electrode and a second electrode; and
wherein a distance between the first electrode and the second electrode varies as a function of the first length and the second length.

25. A method of mixing a fluid, comprising:
providing a pair of electrodes, wherein at least one electrode of the pair of electrodes has one or more turns formed therein;
flowing fluid in a fluid flow direction across the pair of electrodes; and
applying a voltage potential across the pair of electrodes, such that a plasma discharge is produced in the fluid, wherein when the plasma discharge is produced turbulence is generated in the fluid that mixes the fluid;
wherein applying the voltage potential comprises applying the voltage potential in a duty cycle such that in each cycle of the duty cycle the voltage potential is applied for one or more portions of the cycle and not applied for the other portions of the cycle.

26. The method according to embodiment 25, wherein the duration of the one or more portions of the cycle is 20% to 50% of the duration of the cycle.

27. The method according to embodiment 25, wherein the duration of the one or more portions of the cycle is about 25% of the duration of the cycle.

28. The method according to embodiment 25, wherein when the plasma discharge is produced turbulence is generated in the fluid that mixes the fluid by pushing a first portion of the fluid in a first direction and a second portion of the fluid in a second direction, wherein the first direction and the second direction are non-parallel.

29. The method according to embodiment 28,
wherein when the plasma discharge is produced the turbulence generated in the fluid mixes the fluid by pushing a third portion of the fluid in a third direction;
wherein the first direction is not parallel to the fluid flow direction;
wherein the second direction is not parallel to the fluid flow direction and not parallel to the first direction; and
wherein the third direction is parallel to the fluid flow direction.

30. The method according to embodiment 25, wherein each electrode of the pair of electrodes has a plurality of turns formed therein.

31. The method according to embodiment 30,
wherein the pair of electrodes comprises a first electrode and a second electrode;
wherein the first electrode has a first plurality of turns;
wherein the second electrode has a second plurality of turns;
wherein the first plurality of turns formed in the first electrode correspond to the second plurality of turns formed in the second electrode; and
wherein each turn of the first plurality of turns formed in the first electrode is positioned on the first electrode in the same order as the corresponding turn of the second plurality of turns formed in the second electrode.

32. The method according to embodiment 25, wherein each electrode of the pair of electrodes has a serpentine shape comprising at least two periods.

33. The method according to embodiment 25,
wherein the pair of electrodes comprises a first electrode and a second electrode;
wherein the first electrode has a first length;
wherein the second electrode has a second length; and
wherein a distance between the first electrode and the second electrode is approximately constant as a function of the first length and the second length.

34. The method according to embodiment 25,
wherein the pair of electrodes comprises a first electrode and a second electrode; and
wherein a distance between the first electrode and the second electrode varies as a function of the first length and the second length.

35. A method of mixing at least two fluids, comprising:
providing a first fluid and a second fluid to a chamber having an inlet, wherein the chamber comprises a pair of electrodes on or proximate an inner surface of the chamber, wherein at least one electrode of the pair of electrodes has one or more turns formed therein; and
applying a voltage potential across the pair of electrodes to produce a plasma discharge in at least one of the fluids, wherein when the plasma discharge is produced turbulence is generated that mixes the first fluid and the second fluid.

36. The method according to embodiment 35, wherein at least a portion of the chamber has a tubular cross-section, wherein the pair of electrodes is provided around an entire perimeter of the inner surface of the at least a portion of the chamber.

37. The method according to embodiment 35, wherein at least one electrode of the pair of electrodes has a plurality of turns formed therein.

38. The method according to embodiment 35, wherein each electrode of the pair of electrodes has one or more turns formed therein.

39. The method according to embodiment 35, wherein each electrode of the pair of electrodes has a plurality of turns fainted therein.

40. The method according to embodiment 35, wherein each electrode of the pair of electrodes has a serpentine shape comprising at least two periods.

41. The method according to embodiment 39,
wherein the pair of electrodes comprises a first electrode and a second electrode;
wherein the first electrode has a first plurality of turns;
wherein the second electrode has a second plurality of turns;
wherein the first plurality of turns formed in the first electrode correspond to the second plurality of turns formed in the second electrode; and
wherein each turn of the first plurality of turns formed in the first electrode is positioned on the first electrode in the same order as the corresponding turn of the second plurality of turns formed in the second electrode.

42. The method according to embodiment 41, wherein each turn of the first plurality of turns formed in the first electrode is made at a corresponding approximately same angle as the corresponding turn of the second plurality of turns formed in the second electrode.

43. The method according to embodiment 35,
wherein the pair of electrodes comprises a first electrode and a second electrode;
wherein the first electrode has a first length;
wherein the second electrode has a second length; and
wherein a distance between the first electrode and the second electrode is approximately constant as a function of the first length and the second length.

44. The method according to embodiment 35,
wherein the pair of electrodes comprises a first electrode and a second electrode; and
wherein a distance between the first electrode and the second electrode varies as a function of the first length and the second length.

45. The method according to embodiment 35, wherein the first fluid is air.

46. The method according to embodiment 45, wherein the second fluid is fuel.

47. A method of mixing a fluid, comprising:
providing a pair of electrodes, wherein each electrode of the pair of electrodes has a straight-line shape along a length of the electrode and is parallel to the other electrode of the pair of electrodes, wherein the pair of electrodes extend in an electrode direction;
flowing a fluid in a fluid flow direction across the pair of electrodes; and
applying a voltage potential across the pair of electrodes, such that a plasma discharge is produced in the fluid, wherein when the plasma discharge is produced turbulence is generated in the fluid that induces mixing in the fluid, wherein the fluid flow direction is perpendicular to the electrode direction.

48. The method according to embodiment 47, wherein after passing over the pair of electrodes the fluid flows in a direction that is raised by an angle in a range of from 15° to 60° with respect to the fluid flow direction.

49. The method according to embodiment 48, wherein the angle is in a range of from 15° to 30° with respect to the fluid flow direction.

50. The method according to embodiment 48, wherein the angle is in a range of from 30° to 60° with respect to the fluid flow direction.

51. The method according to embodiment 48, wherein the angle is about 30° with respect to the fluid flow direction.

What is claimed is:

1. A device for mixing combustion materials, comprising:
a chamber comprising an inlet;
a pair of electrodes positioned on or proximate an inner surface of the chamber,
wherein the pair of electrodes comprises a first electrode and a second electrode,
wherein the first electrode and the second electrode are separated by a dielectric material, and
wherein each of the first electrode and the second electrode has a plurality of curves formed therein forming at least a serpentine shape defined by a wave having a series of horseshoe shapes extending from one wave crest to a next wave crest, wherein the serpentine shape is formed in three dimensions and is configured to produce pinching and spreading effects on a fluid as the fluid passes over the first and second electrodes; and
a power supply configured to apply a voltage across the pair of electrodes,
wherein the device is configured such that when the fluid is proximate the pair of electrodes, application of the voltage across the pair of electrodes generates a plasma in the fluid and applies a plurality of electrohydrodynamic forces to the fluid that comprise streamwise, crosswise, and surface normal electrohydrodynamic forces,
wherein application of the voltage across the pair of electrodes results in a dielectric barrier discharge,
wherein the dielectric barrier discharge produces the plasma in the fluid,
wherein the plurality of electrohydrodynamic forces comprising the streamwise, crosswise, and surface normal electrohydrodynamic forces applied to the fluid generates turbulence in the fluid that mixes the fluid.

2. The device according to claim 1, wherein an at least a portion of the chamber has a tubular cross-section,
wherein the pair of electrodes is provided around an entire perimeter of the inner surface of the at least a portion of the chamber.

3. The device according to claim 1, wherein an at least a portion of the chamber has a tubular cross-section,
wherein the pair of electrodes is provided around at least 90% of the perimeter of the inner surface of the at least a portion of the chamber.

4. The device according to claim 1, wherein an at least a portion of the chamber has a tubular cross-section,
wherein the pair of electrodes is provided around at least 80% of the perimeter of the inner surface of the at least a portion of the chamber.

5. The device according to claim 1, wherein an at least a portion of the chamber has a tubular cross-section,
wherein the pair of electrodes is provided around at least 50% of the perimeter of the inner surface of the at least a portion of the chamber.

6. The device according to claim 1, wherein the first electrode has a first serpentine shape comprising a first at least two periods, and
wherein the second electrode has a second serpentine shape comprising a second at least two periods.

7. The device according to claim 1, wherein the plurality of curves formed in the first electrode corresponds to the plurality of curves formed in the second electrode, and
wherein each curve of the plurality of curves formed in the first electrode is positioned in the first electrode in a first order,
wherein each curve of the plurality of curves formed in the second electrode is positioned in the second electrode in a second order, and
wherein the second order is the same as the first order.

8. The device according to claim 7, wherein each curve of the plurality of curves formed in the first electrode is made at a corresponding first angle of a corresponding plurality of first angles,
   wherein each curve of the plurality of curves formed in the second electrode is made at a corresponding second angle of a corresponding plurality of second angles,
   wherein each first angle of the plurality of first angles is the same as the corresponding second angle of the plurality of second angles.

9. The device according to claim 1, wherein the first electrode has a first length,
   wherein the second electrode has a second length, wherein:
   (i) a distance between the first electrode and the second electrode is constant as a function of the first length; and
   the distance between the first electrode and the second electrode is constant as a function of the second length; or
   (ii) a distance between the first electrode and the second electrode varies as a function of the first length; and
   wherein the distance between the first electrode and the second electrode varies as a second function of the second length.

10. The device according to claim 1, wherein the device is configured to receive the fluid via the inlet,
    wherein at least a portion of the fluid received via the inlet is proximate the pair of electrodes,
    wherein the pair of electrodes are configured such that when the voltage is applied across the pair of electrodes when the at least a portion of the fluid is proximate the pair of electrodes, the plasma is produced in the fluid; and
    wherein when the plasma is produced in the fluid, one or more three-dimensional flow structures are generated in the fluid that induce mixing of the fluid.

11. The device according to claim 10, wherein at least one three-dimensional flow structure of the one or more three-dimensional flow structures comprises:
    (i) a vortical flow structure; or
    (ii) a counter-rotating vortex pair.

12. The device according to claim 10, wherein a first three-dimensional flow structure of the one or more three-dimensional flow structures is at an angle with a second three-dimensional flow structure of the one or more three-dimensional flow structures.

13. The device according to claim 1, wherein the device is configured such that when a second fluid is in the chamber when the fluid is proximate the pair of electrodes and the voltage is applied across the pair of electrodes, the plasma is generated in the fluid, and the plurality of electrohydrodynamic forces are applied to the fluid,
    wherein the plurality of electrohydrodynamic forces applied to the fluid generates turbulence in the fluid that mixes the fluid and mixes the fluid and the second fluid.

14. A method of mixing a fluid, comprising:
    providing a pair of electrodes,
    wherein the pair of electrodes comprises a first electrode and a second electrode,
    wherein the first electrode and the second electrode are separated by a dielectric material,
    wherein each of the first electrode and the second electrode has one or more curves formed therein forming at least a serpentine shape defined by a wave having a series of horseshoe shapes extending from one wave crest to a next wave crest, wherein the serpentine shape is formed in three dimensions and is configured to produce pinching and spreading effects on a fluid as the fluid passes over the first and second electrodes;
    flowing the fluid in a fluid flow direction across the pair of electrodes; and
    applying a voltage across the pair of electrodes, such that a plasma is generated in the fluid, and a plurality of electrohydrodynamic forces that comprise streamwise, crosswise, and surface normal electrohydrodynamic are applied to the fluid,
    wherein application of the voltage across the pair of electrodes results in a dielectric barrier discharge,
    wherein the dielectric barrier discharge produces the plasma in the fluid,
    wherein the plurality of electrohydrodynamic forces generate turbulence in the fluid that mixes the fluid,
    wherein the plurality of electrohydrodynamic forces comprising the streamwise, crosswise, and surface normal electrohydrodynamic forces applied to the fluid generates turbulence in the fluid by pushing a first portion of the fluid in a first direction and pushing a second portion of the fluid in a second direction, and
    wherein the first direction and the second direction are non-parallel.

15. A method of mixing a fluid, comprising:
    providing a pair of electrodes,
    wherein the pair of electrodes comprises a first electrode and a second electrode,
    wherein the first electrode and the second electrode are separated by a dielectric material,
    wherein each of the first electrode and the second electrode has one or more curves formed therein forming at least a serpentine shape defined by a wave having a series of horseshoe shapes extending from one wave crest to a next wave crest, wherein the serpentine shape is formed in three dimensions and is configured to produce pinching and spreading effects on a fluid as the fluid passes over the first and second electrodes;
    flowing the fluid in a fluid flow direction across the pair of electrodes; and
    applying a voltage across the pair of electrodes, such that a plasma is generated in the fluid and a plurality of electrohydrodynamic forces that comprise streamwise, crosswise, and surface normal electrohydrodynamic are applied to the fluid,
    wherein application of the voltage across the pair of electrodes results in a dielectric barrier discharge,
    wherein the dielectric barrier discharge produces the plasma in the fluid,
    wherein the plurality of electrohydrodynamic forces comprising the streamwise, crosswise, and surface normal electrohydrodynamic forces applied to the fluid generates turbulence in the fluid that mixes the fluid, and
    wherein applying the voltage comprises applying the voltage in a duty cycle such that in each cycle of the duty cycle the voltage is applied for one or more portions of the cycle and not applied for the other portions of the cycle.

16. A method of mixing at least two fluids, comprising:
    providing a first fluid and a second fluid to a chamber having an inlet,
    wherein the chamber comprises a pair of electrodes on or proximate an inner surface of the chamber such that at least one of the first fluid and the second fluid are proximate the pair of electrodes,
    wherein the pair of electrodes comprises a first electrode and a second electrode, wherein the first electrode and the second electrode are separated by a dielectric material, and wherein each of the first electrode and the second electrode has one or more curves formed therein forming at least a serpentine shape defined by a wave having a series of horseshoe shapes extending from one wave crest to a next wave crest, wherein the serpentine shape is formed in three dimensions and is configured to produce pinching and spreading effects on a fluid as the fluid passes over the first and second electrodes; and applying a voltage across the pair of electrodes, such that a plasma is generated in the at least one of the first fluid and the second fluid, and a plurality of electrohydrodynamic forces that comprise streamwise, crosswise, and surface normal electrohydrodynamic are applied to the at least one of the first fluid and the second fluid, wherein application of the voltage across the pair of electrodes results in a dielectric barrier discharge, wherein the dielectric barrier discharge produces the plasma in the at least one of the first fluid and the second fluid, and wherein the plurality of electrohydrodynamic forces comprising the streamwise, crosswise, and surface normal electrohydrodynamic forces applied to the at least one of the first fluid and the second fluid generates turbulence in the at least one of the first fluid and the second fluid that mixes the at least one of the first fluid and the second fluid and mixes the first fluid and the second fluid.

\* \* \* \* \*